US012537346B2

(12) United States Patent
Ikegami et al.

(10) Patent No.: US 12,537,346 B2
(45) Date of Patent: Jan. 27, 2026

(54) FIRST CONNECTOR AND CONNECTOR MODULE

(71) Applicants: KYOCERA CORPORATION, Kyoto (JP); SUMITOMO ELECTRIC INDUSTRIES, LTD., Osaka (JP)

(72) Inventors: Fumihito Ikegami, Funabashi (JP); Masayoshi Kakino, Yokohama (JP); Tatsuo Matsuda, Osaka (JP); Chiaki Kojima, Osaka (JP)

(73) Assignees: KYOCERA CORPORATION, Kyoto (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 321 days.

(21) Appl. No.: 18/137,264

(22) Filed: Apr. 20, 2023

(65) Prior Publication Data

US 2023/0261426 A1 Aug. 17, 2023

Related U.S. Application Data

(63) Continuation of application No. PCT/JP2022/026886, filed on Jul. 6, 2022.

(30) Foreign Application Priority Data

Oct. 29, 2021 (JP) ................................ 2021-178123

(51) Int. Cl.

| | |
|---|---|
| ***H01R 13/6597*** | (2011.01) |
| ***H01R 12/77*** | (2011.01) |
| *H01R 12/79* | (2011.01) |

(52) U.S. Cl.

CPC ....... *H01R 13/6597* (2013.01); *H01R 12/771* (2013.01); *H01R 12/775* (2013.01); *H01R 12/79* (2013.01)

(58) Field of Classification Search

CPC ........... H01R 13/6597; H01R 13/6596; H01R 12/596; H01R 12/775; H01R 12/771

(Continued)

(56) References Cited

U.S. PATENT DOCUMENTS

| | | | | |
|---|---|---|---|---|
| 7,189,105 B2 * | 3/2007 | Takaku ................ | H01R 12/592 439/98 |
| 7,192,300 B2 * | 3/2007 | Hashiguchi .......... | H01R 9/0524 439/497 |

(Continued)

FOREIGN PATENT DOCUMENTS

| | | | |
|---|---|---|---|
| CN | 211605519 U | 9/2020 | |
| DE | 102015116451 A1 * | 4/2016 | ........... H01R 12/774 |

(Continued)

*Primary Examiner* — Marcus E Harcum
(74) *Attorney, Agent, or Firm* — Duane Morris LLP

(57) ABSTRACT

A first connector 10 configured to be attached to a connection object 40 that includes a plurality of contact lines 42 exposed at a tip of the connection object 40 and a ground portion 43 covering part of the plurality of contact lines 42, comprises: a first insulator 20 including a holding portion 24 configured to hold the connection object 40 in a state of accommodating the tip; and a first metal member 30 attached to the first insulator 20, wherein the first metal member 30 includes: a first base portion 31 that is plate-shaped; a first contact portion 32 configured to extend from the first base portion 31 toward the tip and contact the plurality of contact lines 42; and a second contact portion 33 configured to be located more on a side opposite to the tip than the first contact portion 32 and contact the ground portion 43.

11 Claims, 17 Drawing Sheets

(58) Field of Classification Search
USPC .................................................. 439/497, 499
See application file for complete search history.

(56) References Cited

U.S. PATENT DOCUMENTS

| | | | | |
|---|---|---|---|---|
| 7,192,301 | B2 * | 3/2007 | Kuroda | H01R 13/6589 439/497 |
| 7,559,772 | B2 * | 7/2009 | Tsai | H01R 12/592 439/495 |
| 7,833,049 | B2 * | 11/2010 | Wang | H01R 12/62 439/497 |
| 8,043,114 | B2 * | 10/2011 | Kaneko | H01R 12/775 439/468 |
| 8,052,464 | B2 * | 11/2011 | Maruishi | H01R 12/79 439/496 |
| 8,231,407 | B1 * | 7/2012 | Zhao | H01R 12/592 439/497 |
| 8,585,433 | B2 * | 11/2013 | Honda | H01R 12/79 439/77 |
| 8,727,803 | B2 * | 5/2014 | Kurachi | H01R 13/639 439/497 |
| 8,851,922 | B2 * | 10/2014 | Miyazaki | H01R 12/712 439/497 |
| 9,720,186 | B2 * | 8/2017 | Matsubara | G02B 6/3897 |
| 10,559,928 | B2 | 2/2020 | Muro | |
| 10,897,098 | B2 * | 1/2021 | Suda | H01R 12/774 |
| 2011/0008975 | A1 * | 1/2011 | Yamaji | H01R 12/79 439/153 |
| 2011/0014811 | A1 * | 1/2011 | Chuo | H01R 13/6593 439/497 |
| 2011/0294340 | A1 * | 12/2011 | Kojima | H01R 12/598 439/497 |
| 2012/0077366 | A1 * | 3/2012 | Tsunemura | H01R 12/79 439/372 |
| 2019/0296488 | A1 * | 9/2019 | Nakajima | H01R 13/639 |

FOREIGN PATENT DOCUMENTS

| | | | |
|---|---|---|---|
| JP | 2011008978 | A | 1/2011 |
| JP | 2019-110089 | A | 7/2019 |
| TW | 201304316 | A | 1/2013 |

* cited by examiner

50

1

FIRST CONNECTOR AND CONNECTOR MODULE

CROSS REFERENCE TO RELATED APPLICATION

This application claims priority to and the benefit of Japanese Patent Application No. 2021-178123 filed on Oct. 29, 2021, the entire disclosure of which is incorporated herein by reference.

TECHNICAL FIELD

The present disclosure relates to a first connector and a connector module.

BACKGROUND

In recent years, the speed of signal transmission has been increasing in electronic devices, including information processing devices such as personal computers (PCs), industrial devices, and on-vehicle devices. Connectors for electrically connecting flexible flat cables (FFCs), flexible printed circuit boards (FPCs), and the like to circuit boards are also required to be designed for high-speed transmission.

For example, PTL 1 discloses an electrical connector that enables good electromagnetic shielding of signal transmission paths without additional operations.

CITATION LIST

Patent Literature

PTL 1: JP 2019-110089 A

SUMMARY

Technical Problem

A first connector according to an embodiment of the present disclosure is a first connector configured to be attached to a connection object that includes a plurality of contact lines exposed at a tip of the connection object and a ground portion covering part of the plurality of contact lines, the first connector comprising: a first insulator including a holding portion configured to hold the connection object in a state of accommodating the tip; and a first metal member attached to the first insulator, wherein the first metal member includes: a first base portion that is plate-shaped; a first contact portion configured to extend from the first base portion toward the tip and contact the plurality of contact lines; and a second contact portion configured to be located more on a side opposite to the tip than the first contact portion and contact the ground portion.

A connector module according to an embodiment of the present disclosure is a connector module comprising: the foregoing first connector; and a second connector configured to be fitted to the first connector, wherein the second connector includes: a second insulator configured to be fitted to the first insulator; and a first contact attached to the second insulator, and the first contact includes a third contact portion configured to contact the first metal member.

A connector module according to an embodiment of the present disclosure is a connector module comprising: the foregoing first connector; and a second connector configured to be fitted to the first connector, wherein the second connector includes: a second insulator configured to be fitted to the first insulator; and a first contact attached to the second insulator, and the first contact includes a third contact portion configured to contact the plurality of contact lines which the first contact portion is configured to contact.

DETAILED DESCRIPTION

Figure 1:
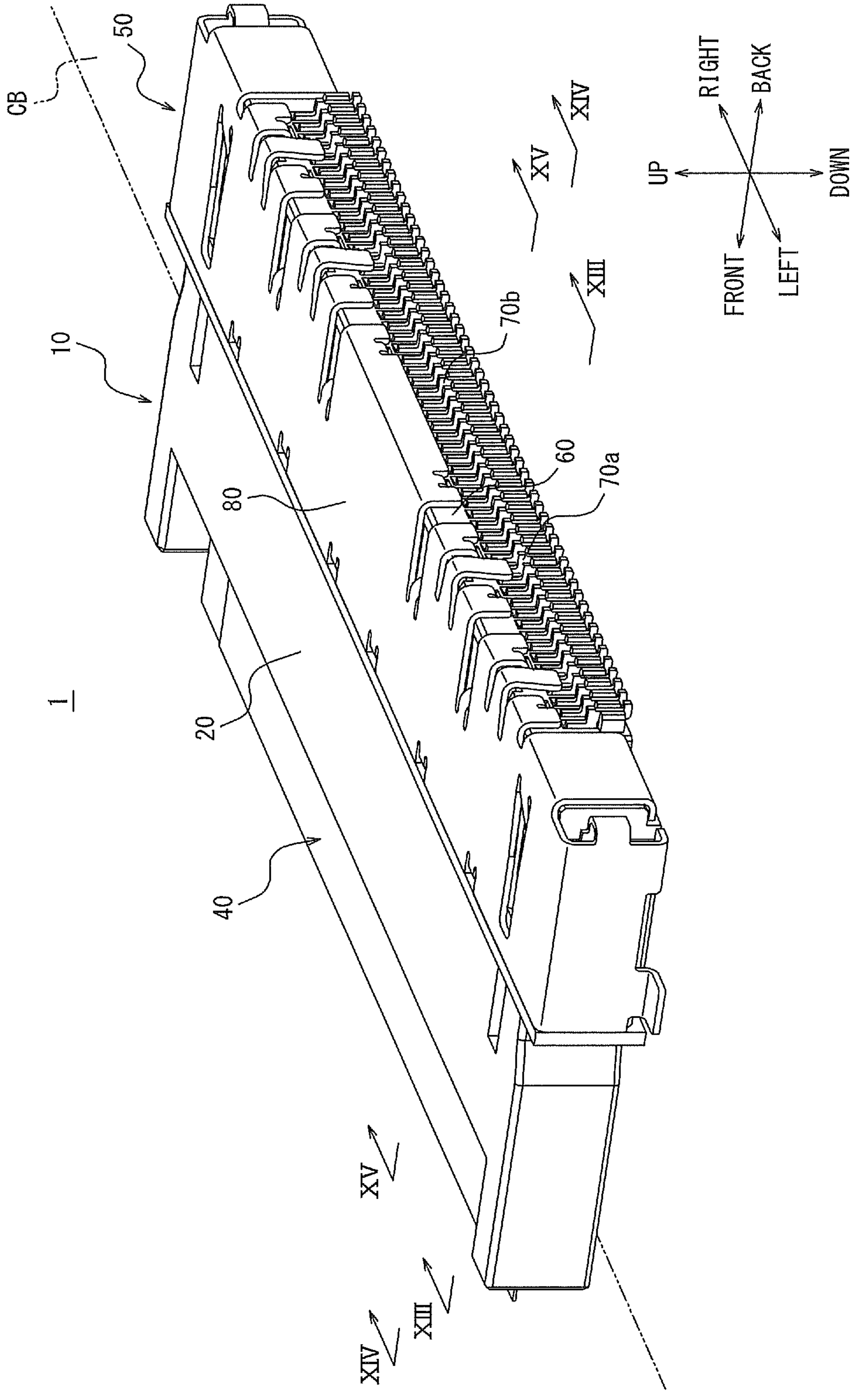
FIG. 1 is an external perspective diagram illustrating a connector module according to an embodiment in a state in which a first connector holding a connection object and a second connector are connected to each other, in a top view.

For the electrical connector described in PTL 1, improvement in transmission characteristics in signal transmission, including suppression of crosstalk, under high-speed transmission standards such as Universal Serial Bus (USB) 4.0 is not fully considered.

With a first connector and a connector module according to an embodiment of the present disclosure, it is possible to obtain good transmission characteristics in signal transmission.

An embodiment of the present disclosure will be described in detail below, with reference to the attached drawings. The directions such as front, back, right, left, up (top), and down (bottom) in the following description are based on the directions of the arrows in the drawings. The directions of the arrows are consistent throughout the drawings. In some drawings, the below-described circuit board CB is omitted for the sake of simplicity.

Figure 2:
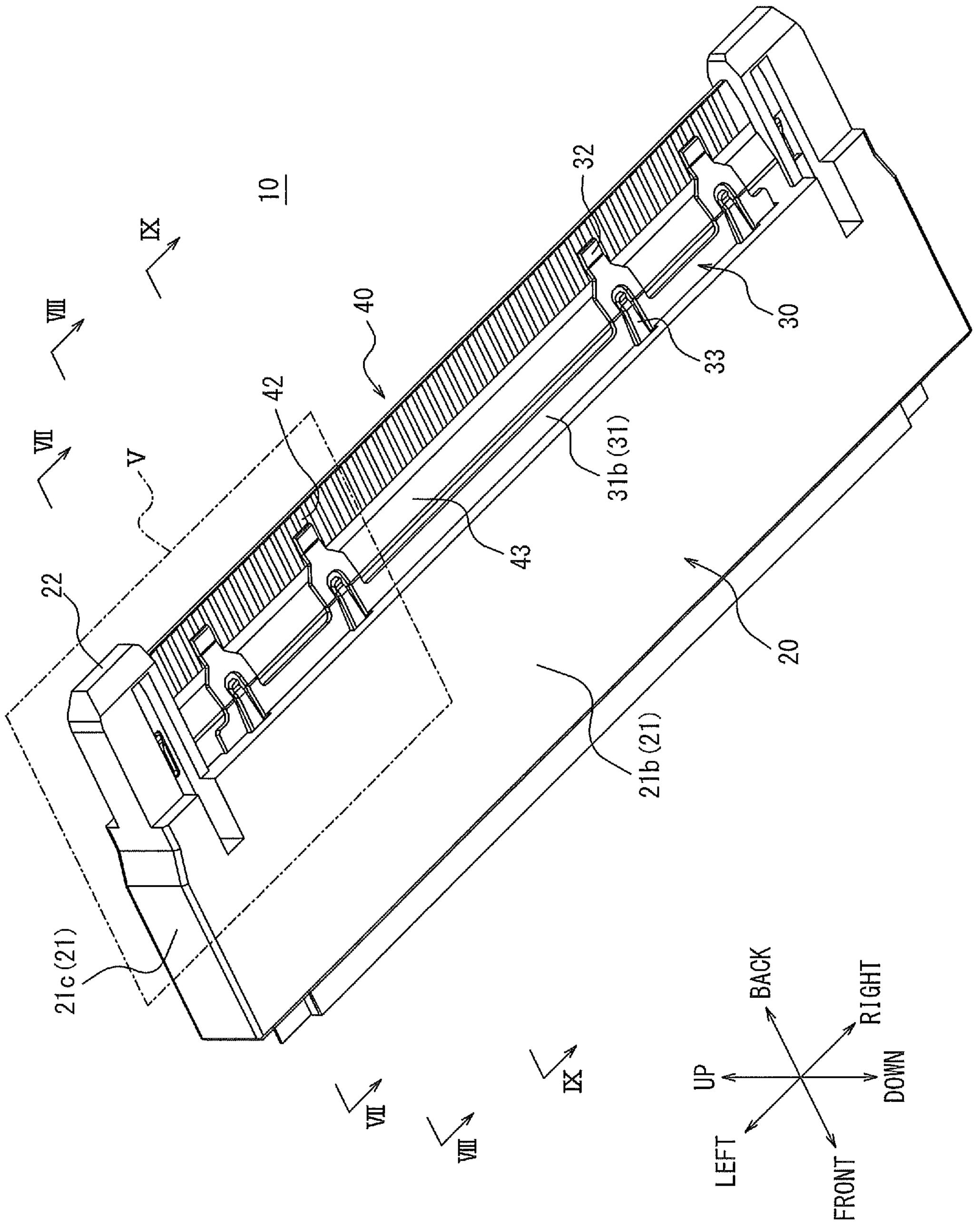
FIG. 2 is an external perspective diagram illustrating the first connector in FIG. 1 holding the connection object, in a bottom view.

FIG. 1 is an external perspective diagram illustrating a connector module 1 according to an embodiment in a state in which a first connector 10 holding a connection object 40 and a second connector 50 are connected to each other, in a top view. FIG. 2 is an external perspective diagram illustrating the first connector 10 in FIG. 1 holding the connection object 40, in a bottom view. The structures of the connector module 1 and the first connector 10 according to the embodiment will be mainly described below, with reference to FIGS. 1 and 2.

The connector module 1 includes the first connector 10 and the second connector 50 connectable to each other.

The second connector 50 according to the embodiment is mounted on the circuit board CB. The circuit board CB may be a rigid board, or any circuit board other than a rigid board. The second connector 50 electrically connects the connection object 40 inserted in the second connector 50 together with the first connector 10 and the circuit board CB. The connection object 40 can be inserted into and removed from the second connector 50 via the first connector 10. The second connector 50 is connected to the connection object 40 in a state in which the connection object 40 is inserted.

The second connector 50 includes a second insulator 60, one or more first contacts 70*a*, one or more second contacts 70*b*, and a second metal member 80. The first contacts 70*a*, the second contacts 70*b*, and the second metal member 80 are attached to the second insulator 60.

The first connector 10 holds the connection object 40. For example, the first connector 10 receives the connection object 40 inserted backward from the front and supports the right and left ends of the connection object 40 to hold the whole connection object 40.

The connection object 40 held by the first connector 10 is, for example, an FFC. The connection object 40 is, however, not limited to this, and may be any cable that is electrically connected to the circuit board CB via the first connector 10 and the second connector 50. For example, the connection object 40 may be an FPC. The connection object 40 is not limited to cables as described above and may include any object. For example, the connection object 40 may include a rigid board or any other circuit board.

The first connector 10 can be connected to the second connector 50 in a state of holding the connection object 40. The first connector 10 includes a first insulator 20 that is fitted to the second insulator 60 in a connected state in which the first connector 10 and the second connector 50 are connected to each other. The first connector 10 includes a first metal member 30 attached to the first insulator 20.

The connection object 40 contacts the second contacts 70*b* in a fitted state in which the first insulator 20 and the second insulator 60 are fitted to each other. The first metal member 30 contacts the first contacts 70*a* in a fitted state in which the first insulator 20 and the second insulator 60 are fitted to each other.

In the following description, for example, it is assumed that the second connector 50 according to the embodiment is a receptacle connector, that the first connector 10 is a plug connector, that the second connector 50 in which the first contacts 70*a* and the second contacts 70*b* elastically deform in a fitted state in which the first insulator 20 and the second insulator 60 are fitted to each other is a receptacle connector, and that the first connector 10 holding the connection object 40 in the fitted state is a plug connector. The types of the first connector 10 and the second connector 50 are not limited to such. For example, the second connector 50 may serve as a plug connector and the first connector 10 as a receptacle connector.

In the following description, it is assumed that the connection object 40 is inserted into the second connector 50 in a direction parallel to the circuit board CB on which the second connector 50 is mounted. For example, the connection object 40 is inserted into the second connector 50 in the front-back direction. The insertion direction is not limited to such. The connection object 40 may be inserted into the second connector 50 in a direction orthogonal to the circuit board CB on which the second connector 50 is mounted. The connection object 40 may be inserted into the second connector 50 in the up-down direction.

Herein, the term "extending direction of the plurality of contact lines" means the front-back direction as an example. The term "insertion/removal direction" means the front-back direction as an example. The term "direction orthogonal to the extending direction of the plurality of contact lines" means the up-down direction as an example. The term "tip of the connection object" means the back tip of the connection object as an example. The term "removal side" means the front side as an example. The term "insertion side" means the back side as an example.

Figure 3:
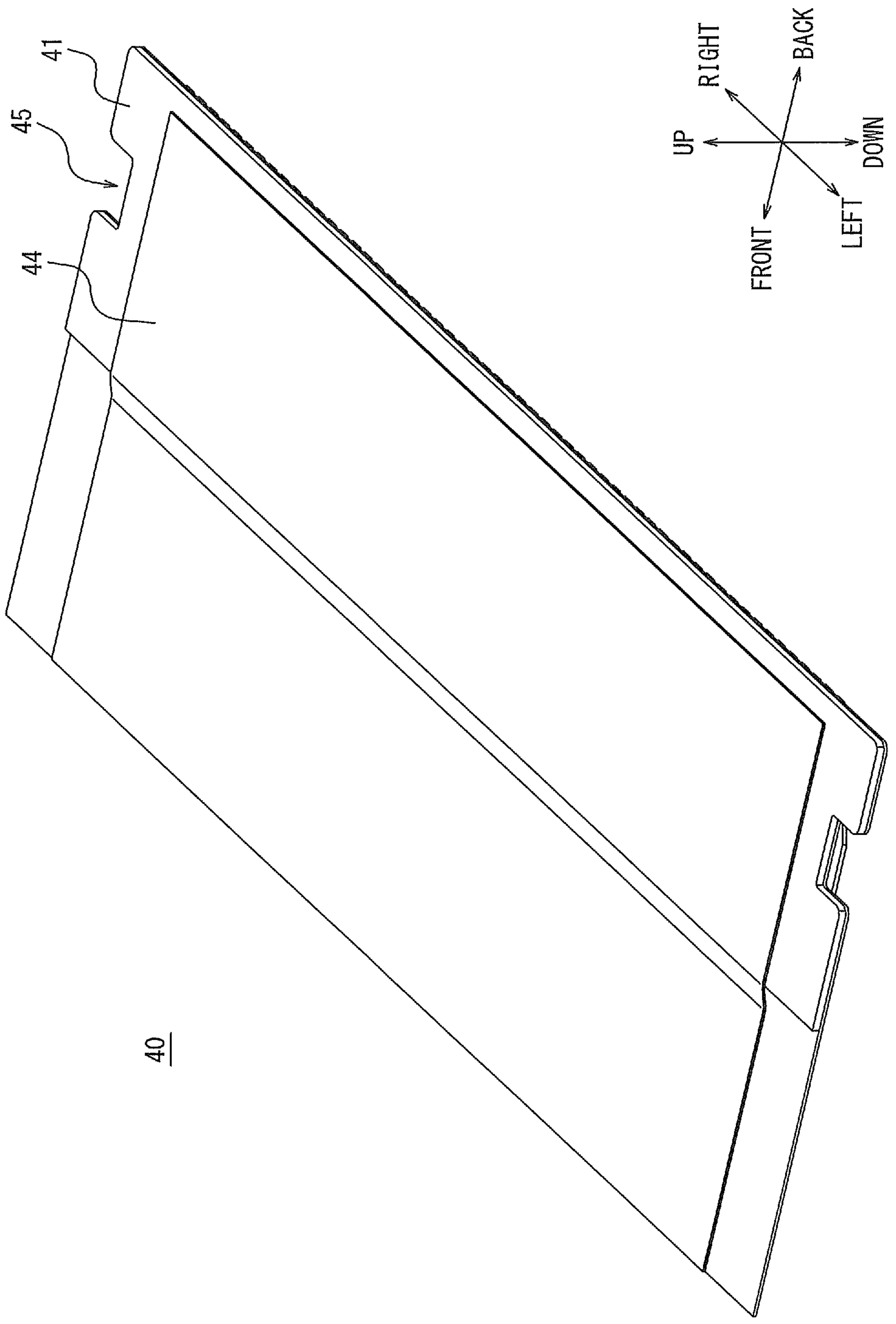
FIG. 3 is an external perspective diagram illustrating the connection object in a state of not being held by the first connector, in a top view.
Figure 4:
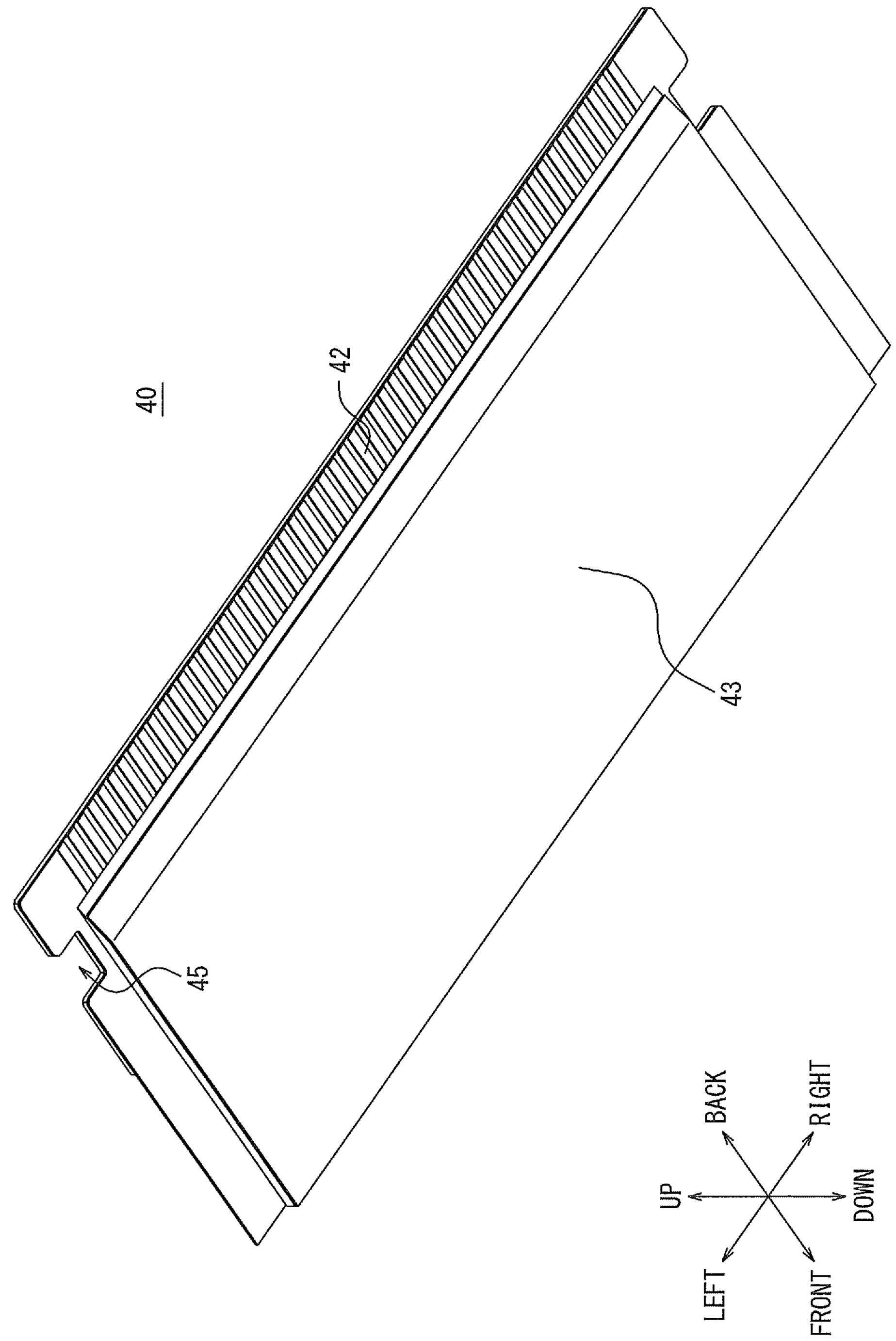
FIG. 4 is an external perspective diagram illustrating the connection object in a state of not being held by the first connector, in a bottom view.

FIG. 3 is an external perspective diagram illustrating the connection object 40 in a state of not being held by the first connector 10, in a top view. FIG. 4 is an external perspective diagram illustrating the connection object 40 in a state of not being held by the first connector 10, in a bottom view. The structure of the connection object 40 that is held by the first connector 10 will be mainly described below, with reference to FIGS. 3 and 4.

The connection object 40 has a stack structure formed by bonding a plurality of thin film materials to each other. The connection object 40 includes a reinforcement portion 41 constituting a tip part in the extending direction of the connection object 40, i.e. the insertion/removal direction in which the connection object 40 is inserted and removed, and harder than other parts. The connection object 40 includes a plurality of contact lines 42 linearly extending in the insertion/removal direction to the tip of the reinforcement portion 41. Each contact line 42 is exposed downward at the tip of the connection object 40.

The connection object 40 includes a first ground portion 43 that covers part of the plurality of contact lines 42 with the lower outermost layer on the removal side of the connection object 40. The first ground portion 43 extends in a flat plate shape from the front toward the back and is bent obliquely upward at its tip. The connection object 40 includes a second ground portion 44 that covers substantially the whole contact lines 42 with the upper outermost layer. The second ground portion 44 extends in a flat plate shape from the front toward the back and is bent obliquely upward at the front edge of the reinforcement portion 41 and stacked on the reinforcement portion 41 at its tip part.

The connection object 40 includes a locked portion 45 formed by notching, inward in the right-left direction, the center of each edge extending in the front-back direction of the tip part of the connection object 40 including the reinforcement portion 41. The locked portion 45 is formed on both of the right and left sides in the tip part of the connection object 40 including the reinforcement portion 41.

Figure 5:
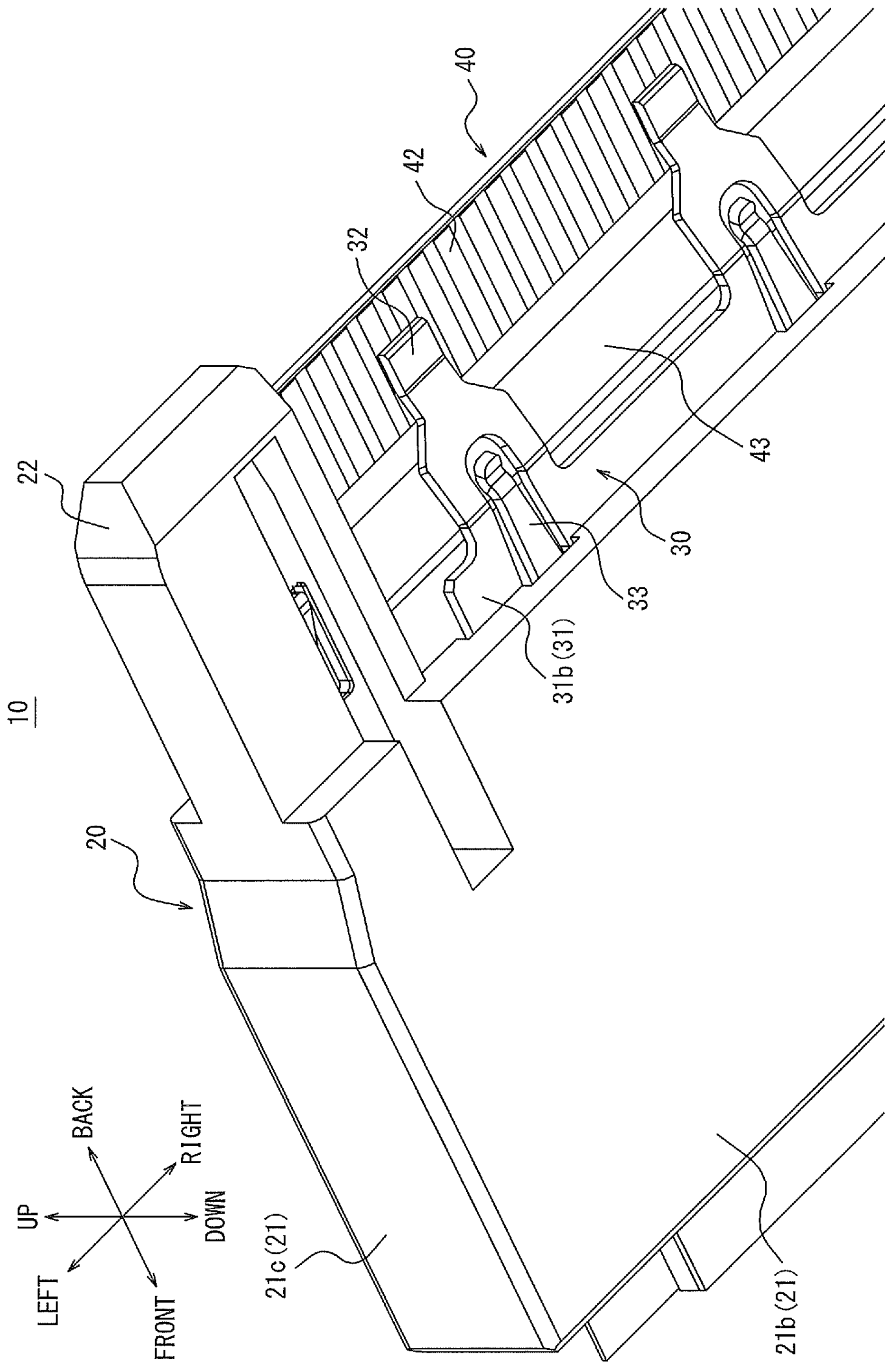
FIG. 5 is an enlarged diagram of dash-dotted line enclosed part V in FIG. 2.
Figure 6:
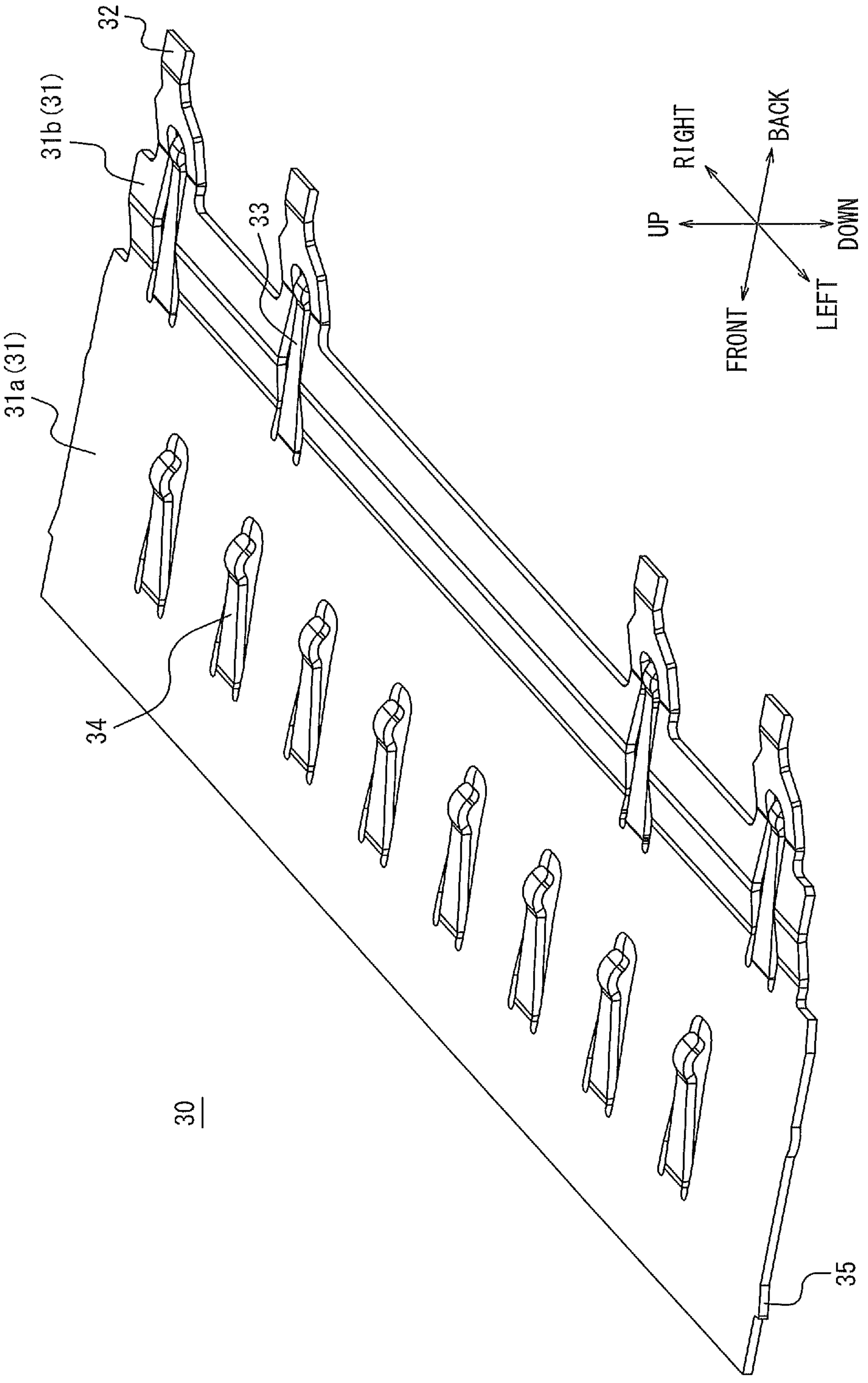
FIG. 6 is an external perspective diagram illustrating a first metal member alone, in a top view.
Figure 7:
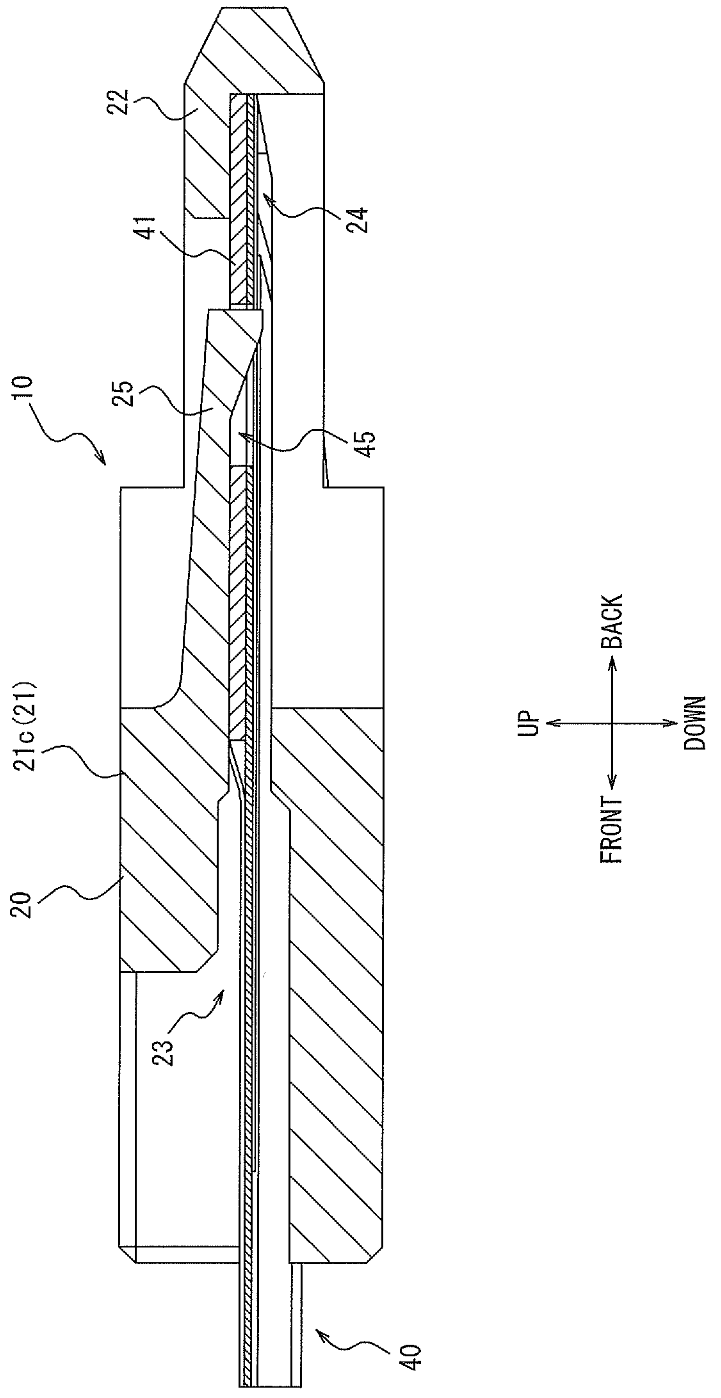
FIG. 7 is a sectional diagram taken along line VII-VII in FIG. 2.
Figure 8:
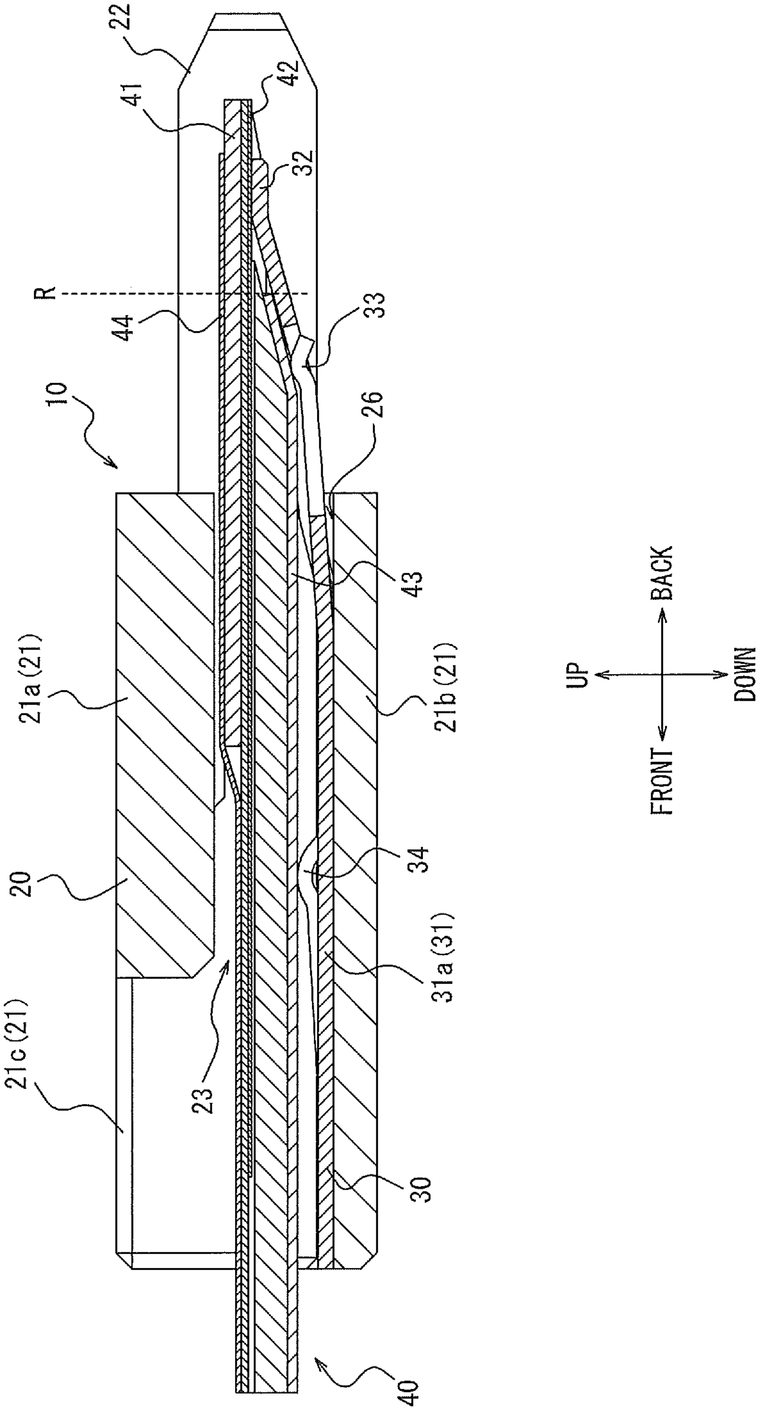
FIG. 8 is a sectional diagram taken along line VIII-VIII in FIG. 2.
Figure 9:
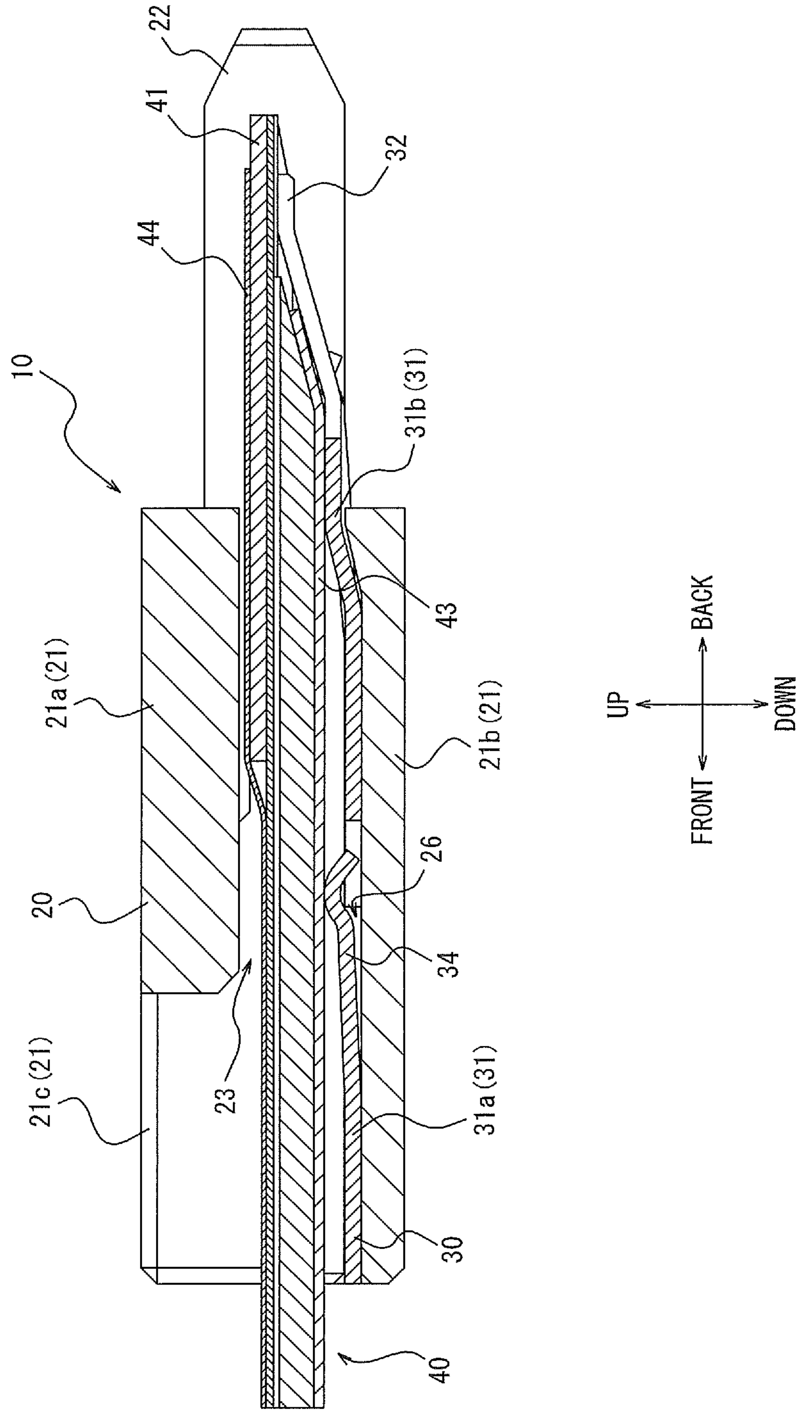
FIG. 9 is a sectional diagram taken along line IX-IX in FIG. 2.

FIG. 5 is an enlarged diagram of dash-dotted line enclosed part V in FIG. 2. FIG. 6 is an external perspective diagram illustrating the first metal member 30 alone, in a top view. FIG. 7 is a sectional diagram taken along line VII-VII in FIG. 2. FIG. 8 is a sectional diagram taken along line VIII-VIII in FIG. 2. FIG. 9 is a sectional diagram taken along line IX-IX in FIG. 2. The structure of the first connector 10 according to the embodiment will be mainly described below, with reference to FIGS. 2 and 5 to 9.

The first insulator 20 is a symmetrical box-shaped member obtained by injection molding an insulating and heat-resistant synthetic resin material. The first insulator 20 includes an outer peripheral wall 21 including four outer walls on the top, bottom, right, and left sides and shaped rectangular as a whole. The outer peripheral wall 21 includes a ceiling wall 21*a*, a bottom wall 21*b*, and a pair of side walls 21*c*. As illustrated in FIG. 5, the first insulator 20 includes a protrusion portion 22 that protrudes from each side wall 21*c* toward the insertion side of the connection object 40 beyond the ceiling wall 21*a* and the bottom wall 21*b*.

As illustrated in FIGS. 7 to 9, the first insulator 20 includes an insertion portion 23 surrounded by the outer peripheral wall 21 on the top, bottom, right, and left sides. As illustrated in FIG. 7, the first insulator 20 includes a holding portion 24 recessed inside the protrusion portion 22. The first insulator 20 includes a locking portion 25 that extends from the central part of each side wall 21*c* in the front-back direction to the central part of the holding portion 24 in the front-back direction. The locking portion 25 is elastically deformable in the up-down direction. As illustrated in FIGS. 8 and 9, the first insulator 20 includes an attachment portion 26 formed along the upper surface of the bottom wall 21*b*.

The first metal member 30 is obtained by forming a thin plate of any metal material into the shape illustrated in FIG. 6 using progressive molding (stamping). The first metal member 30 is obtained by bending in the thickness direction after punching. The working method for the first metal member 30 is, however, not limited to such. For example, the working method may involve only punching. The surface of the first metal member 30 is nickel-plated to form a base, and then plated with gold, tin, or the like as a surface layer plating. Plating including nickel plating and surface layer plating may be partially applied to required parts.

The first metal member 30 includes a first base portion 31 that is plate-shaped in the front, back, right, and left directions. The first base portion 31 includes a first part 31*a* that is formed as a flat plate extending in the front, back, right, and left directions, and a second part 31*b* that bends obliquely upward from the back edge of the first part 31*a* and then extends horizontally.

The first metal member 30 includes one or more first contact portions 32 each of which extends backward from the back edge of the first base portion 31, for example, the second part 31*b*. The first contact portion 32 bends obliquely upward from the back edge of the second part 31*b* and then extends horizontally at its back end. The first contact portion 32 is formed so as to be wide in the right-left direction from the part connected to the second part 31*b* to the center of the part extending obliquely upward and be tapered therefrom toward the tip. The first contact portion 32 is notched in the thickness direction at the center of the part wide in the right-left direction. The first contact portion 32 is elastically deformable in the up-down direction.

The first metal member 30 includes one or more second contact portions 33 each of which is located forward from the first contact portion 32 and extends backward from the back of the first base portion 31, for example, the first part 31*a*. As illustrated in FIG. 8, the second contact portion 33 linearly extends obliquely upward from the back of the first part 31*a* and bends upward at its back end. The second contact portion 33 is tapered so that the width in the right-left direction will continuously decrease from the part connected to the first part 31*a* to the back end. The whole second contact portion 33 fits in the second part 31*b* and the notch formed in the first contact portion 32 in the thickness direction. The back end of the second contact portion 33 is located in the notch formed in the first contact portion 32 in the thickness direction. The second contact portion 33 is elastically deformable in the up-down direction.

A total of four pairs of the first contact portion 32 and the second contact portion 33 are formed in the first metal member 30, two pairs on each of the right and left sides. The pairs of the first contact portion 32 and the second contact portion 33 are arranged apart from each other in the right-left direction. The first contact portion 32 and the second contact portion 33 are linearly arranged in the front-back direction.

The first metal member 30 includes a plurality of tip-up portions 34 arranged at regular intervals in the right-left direction in the central part of the first part 31*a* of the first base portion 31 in the front-back direction. Each tip-up portion 34 linearly extends obliquely upward from the first part 31*a* and bends upward at its back end. The tip-up portion 34 is tapered so that the width in the right-left direction will continuously decrease from the part connected to the first part 31*a* to the back end. The whole tip-up portion 34 is located above the notch formed in the first part 31*a* in the thickness direction. The tip-up portion 34 is elastically deformable in the up-down direction. The tip-up portion 34 is not located on the same straight line as the pair of the first contact portion 32 and the second contact portion 33 but located at a position different from the pair of the first contact portion 32 and the second contact portion 33 in the right-left direction.

The first metal member 30 includes locking parts 35 formed at both of the right and left edges of the first part 31*a* of the first base portion 31.

As illustrated in FIGS. 2, 5, and 7 to 9, the first connector 10 is assembled by inserting the first metal member 30 backward into the first insulator 20 from the front side of the first insulator 20. The first metal member 30 is held by the first insulator 20 in a state of being attached to the attachment portion 26 of the first insulator 20.

The functions of the first connector 10 when the first metal member 30 is attached to the first insulator 20 will be mainly described below.

When the first metal member 30 is attached to the first insulator 20, the locking parts 35 are fixed in the inner surfaces of the side walls 21*c* on the right and left. The back corners of the right and left edges of the first part 31*a* of the first base portion 31 face the forward-facing inner surfaces of the side walls 21*c*.

As illustrated in FIGS. 8 and 9, the first metal member 30 is located along the bottom wall 21*b* of the first connector 10 substantially in the whole lower part of the first connector 10. The first part 31*a* of the first base portion 31 contacts the upper surface of the bottom wall 21*b*. The first contact portion 32 and the second contact portion 33 extend obliquely upward toward the back from the back end of the bottom wall 21*b*. The back end of the tip-up portion 34 is located inside the insertion portion 23.

In a state in which the first metal member 30 is attached to the first insulator 20, the connection object 40 is inserted backward into the insertion portion 23 of the first insulator 20 from the front side of the insertion portion 23. The functions of the first connector 10 when the connection object 40 is inserted in the first insulator 20 and the first connector 10 is attached to the connection object 40 will be mainly described below.

As illustrated in FIG. 7, when the connection object 40 is inserted in the insertion portion 23 and the first connector 10 is attached to the connection object 40, the holding portion 24 holds the connection object 40 in a state of accommodating the tip of the connection object 40. The locking portion 25 engages with the locked portion 45. The locking portion 25 thus functions as a retainer for the connection object 40 in the first connector 10 and prevents unintended removal of the connection object 40 from the first connector 10. In this way, the first connector 10 stably holds the connection object 40.

As illustrated in FIG. 8, the first contact portion 32 extends from the first base portion 31 toward the tip of the connection object 40 and contacts the plurality of contact lines 42. The second contact portion 33 is located more on the side opposite to the tip of the connection object 40 than the first contact portion 32 and contacts the first ground portion 43. The first contact portion 32 and the second contact portion 33 contact the connection object 40 in a state of being elastically deformed downward.

The first contact portion 32 and the second contact portion 33 are located on the same side of the connection object 40 in the direction orthogonal to the extending direction of the plurality of contact lines 42. More specifically, the first contact portion 32 and the second contact portion 33 are located on the same side of the connection object 40 in the up-down direction which is orthogonal to both the extending direction of the plurality of contact lines 42 and the arrangement direction of the first contacts 70*a* and the second contacts 70*b* of the second connector 50. The first contact portion 32 contacts the part of each of the plurality of contact lines 42 adjacent to the boundary R between each contact line 42 and the first ground portion 43. The second contact portion 33 contacts the part of the first ground portion 43 adjacent to the boundary R. The first contact portion 32 and the second contact portion 33 are arranged linearly in the extending direction of the plurality of contact lines 42.

As illustrated in FIG. 5, one first contact portion 32 contacts a plurality of (i.e. two or more) contact lines 42. For example, one first contact portion 32 contacts two contact lines 42 adjacent to each other in the right-left direction.

As illustrated in FIG. 9, the tip-up portion 34 extends backward from the first base portion 31 and contacts the first ground portion 43. The tip-up portion 34 is located more on the side opposite to the tip of the connection object 40 than the first contact portion 32 and the second contact portion 33. The tip-up portion 34 contacts the connection object 40 in a state of being elastically deformed downward.

The tip-up portion 34 is located on the same side of the connection object 40 as the first contact portion 32 and the second contact portion 33 in the direction orthogonal to the extending direction of the plurality of contact lines 42. The tip-up portion 34 is not located on the same straight line in the extending direction of the plurality of contact lines 42 as the first contact portion 32 and the second contact portion 33 but located at a position different from the first contact portion 32 and the second contact portion 33 in the right-left direction.

The second part 31*b* of the first base portion 31 extends backward from the first part 31*a* and contacts the first ground portion 43. The second part 31*b* is located more on the side opposite to the tip of the connection object 40 than the first contact portion 32 and the second contact portion 33. The second part 31*b* is located on the same side of the connection object 40 as the first contact portion 32 and the second contact portion 33 in the direction orthogonal to the extending direction of the plurality of contact lines 42.

Figure 10:
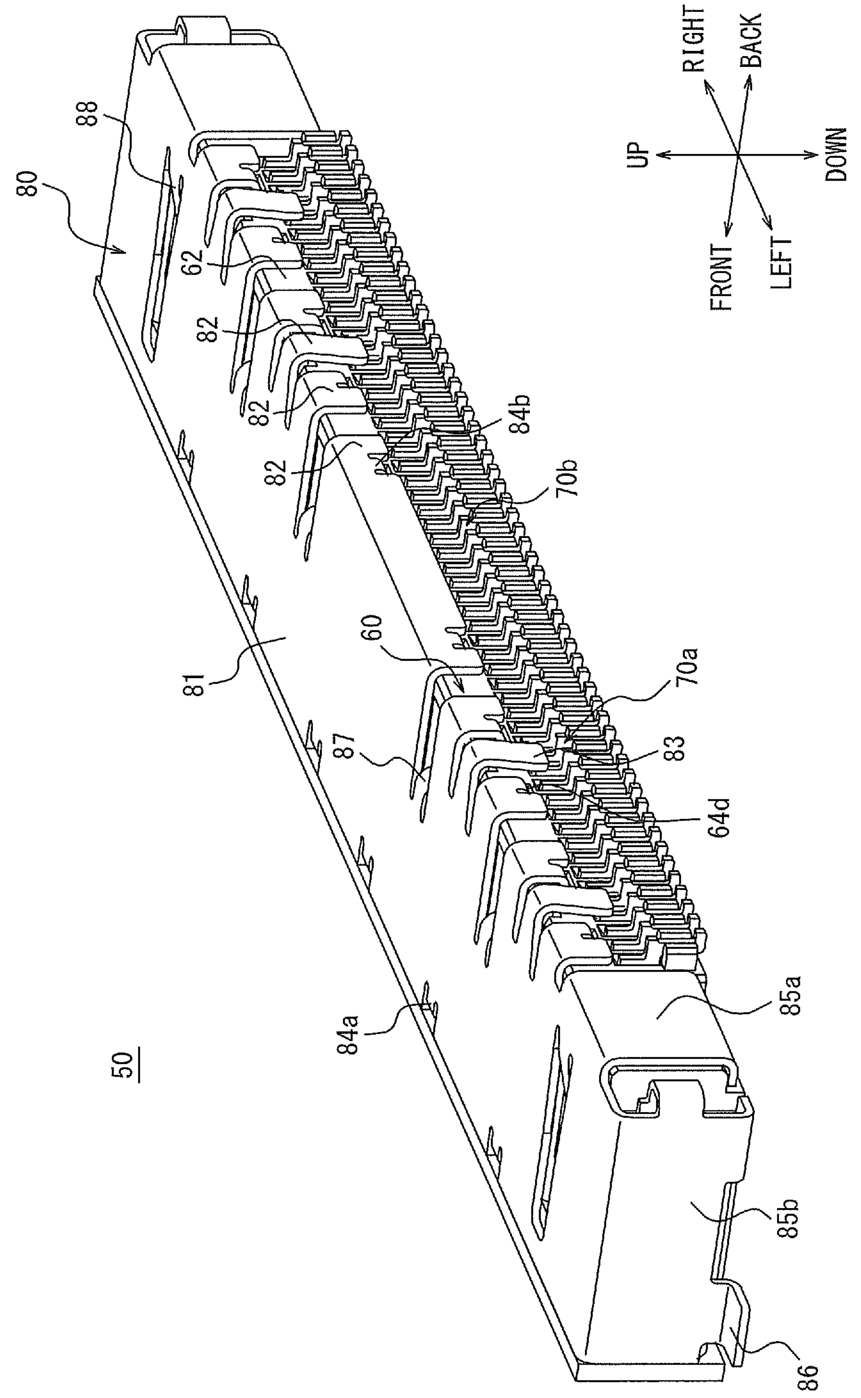
FIG. 10 is an external perspective diagram illustrating the second connector alone in FIG. 1, in a top view from behind.
Figure 11:
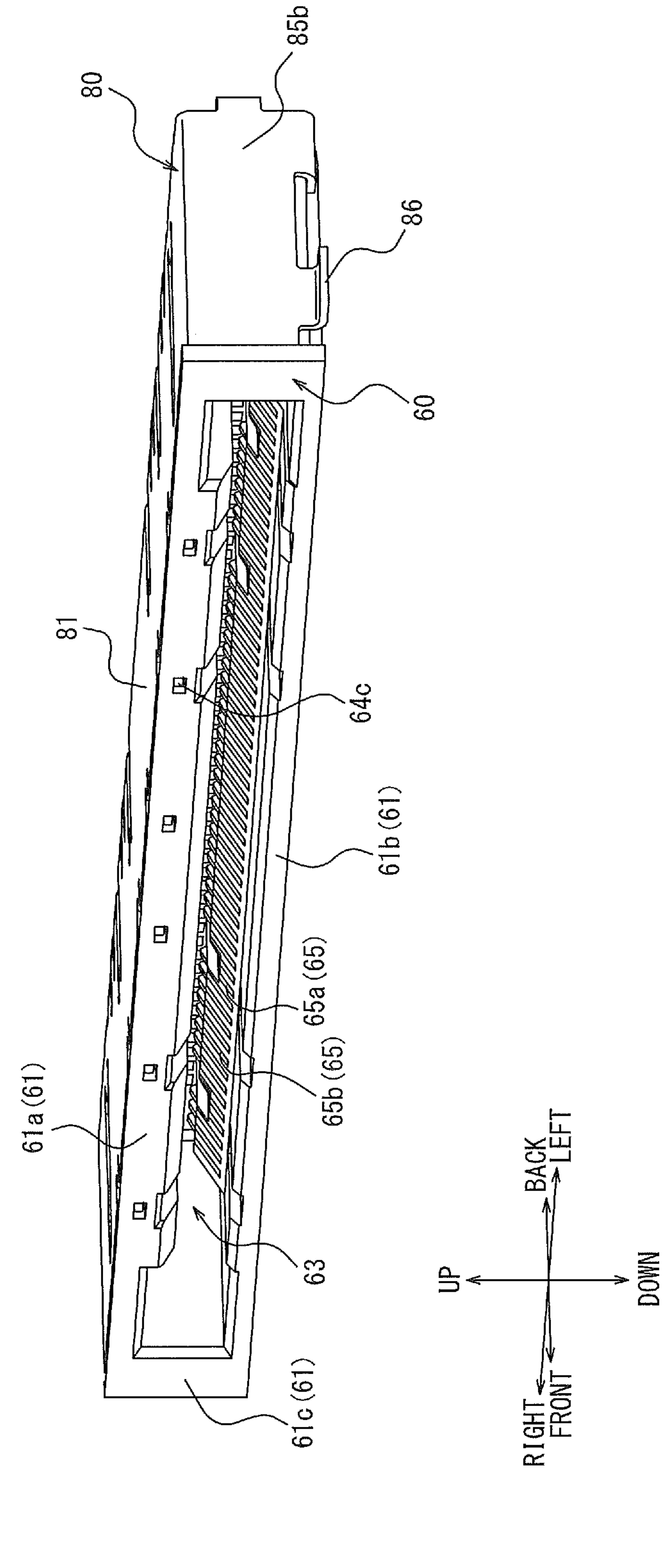
FIG. 11 is an external perspective diagram illustrating the second connector alone in FIG. 1, in a top view from front.
Figure 12:
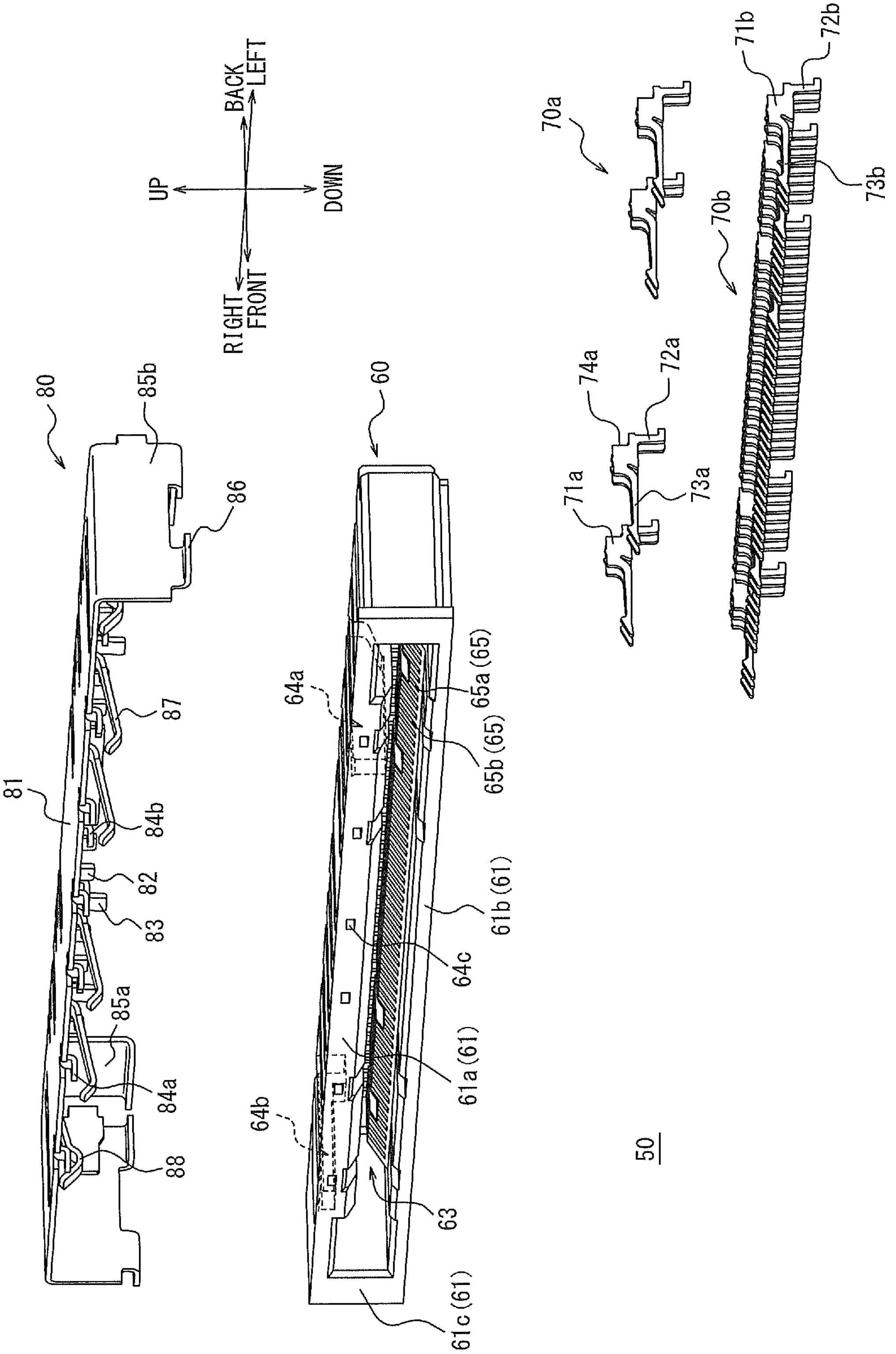
FIG. 12 is an exploded perspective diagram of the second connector alone in FIG. 11.

FIG. 10 is an external perspective diagram illustrating the second connector 50 alone in FIG. 1, in a top view from behind. FIG. 11 is an external perspective diagram illustrating the second connector 50 alone in FIG. 1, in a top view from front. FIG. 12 is an exploded perspective diagram of the second connector 50 alone in FIG. 11. The structure of the second connector 50 according to the embodiment will be described below, mainly with reference to FIGS. 10 to 12.

The second connector 50 is assembled by the following method as an example. The first contacts 70*a* and the second contacts 70*b* are press-fitted into the second insulator 60 from behind the second insulator 60. The second metal member 80 is press-fitted into the second insulator 60 so as to cover the whole second insulator 60 from above. With reference to FIG. 1, the second connector 50 is mounted on the circuit board CB. The second connector 50 electrically connects the connection object 40 and the circuit board CB via the first contacts 70*a* and the second contacts 70*b*.

As illustrated in FIG. 12, the second insulator 60 is a symmetrical box-shaped member obtained by injection molding an insulating and heat-resistant synthetic resin material. The second insulator 60 is not limited to such and may be asymmetric in the right-left direction. The second insulator 60 includes an outer peripheral wall 61 including four outer walls on the top, bottom, right, and left sides and shaped rectangular as a whole. The outer peripheral wall 61 includes a ceiling wall 61*a*, a bottom wall 61*b*, and a pair of side walls 61*c*.

As illustrated in FIG. 10, the second insulator 60 includes a back wall 62 formed continuously with the ceiling wall 61*a* and the pair of side walls 61*c*. As illustrated in FIGS. 11 and 12, the second insulator 60 includes an insertion portion 63 surrounded by the outer peripheral wall 61 on the top, bottom, right, and left sides. The front side of the insertion portion 63 is widely opened by the opening of the second insulator 60. The back side of the insertion portion 63 is closed by the back wall 62.

As illustrated in FIG. 12, the second insulator 60 includes first hole portions 64*a* passing through the ceiling wall 61*a* from the upper surface of the ceiling wall 61*a* to the insertion portion 63. Each first hole portion 64*a* extends linearly over substantially the whole ceiling wall 61*a* in the front-back direction. A total of four first hole portions 64*a* are formed in the ceiling wall 61*a*, two on each of the right and left sides. The first hole portions 64*a* are arranged apart from each other in the right-left direction.

The second insulator 60 includes second hole portions 64*b* formed at both of the right and left ends of the ceiling wall 61*a* and passing through the ceiling wall 61*a* from the upper surface of the ceiling wall 61*a* to the insertion portion 63. A pair of second hole portions 64*b* are arranged on each of the right and left outer sides of the entire four first hole portions 64*a*. Each second hole portion 64*b* extends linearly over substantially the whole ceiling wall 61*a* in the front-back direction.

The second insulator 60 includes a plurality of third hole portions 64*c* arranged apart from each other in the right-left direction, at the front edge of the ceiling wall 61*a*. As illustrated in FIG. 10, the second insulator 60 includes a plurality of fourth hole portions 64*d* arranged apart from each other in the right-left direction, at the upper edge of the back wall 62.

As illustrated in FIGS. 11 and 12, the second insulator 60 includes a plurality of contact installation grooves 65 recessed so as to extend in the front-back direction from the outer surface of the back wall 62 to the inside of the insertion portion 63. The plurality of contact installation grooves 65 are arranged in the right-left direction apart from each other at predetermined intervals. The contact installation grooves 65 include first contact installation grooves 65*a* and second contact installation grooves 65*b*. The first contact installation grooves 65*a* are arranged at positions corresponding to the number and installation positions of the first contacts 70*a* illustrated in FIG. 12. The second contact installation grooves 65*b* are arranged at positions corresponding to the number and installation positions of the second contacts 70*b* illustrated in FIG. 12.

Each first contact 70*a* is obtained by forming a thin plate of a copper alloy or a corson copper alloy having spring elasticity, such as phosphor bronze, beryllium copper, or titanium copper, into the shape illustrated in FIG. 12 using progressive molding (stamping). The first contact 70*a* is formed only by punching. The working method for the first contact 70*a* is, however, not limited to such and may include, for example, bending in the thickness direction after punching. The surface of the first contact 70*a* is nickel-plated to form a base, and then plated with gold, tin, or the like as a surface layer plating. A total of eight first contacts 70*a* are arranged in the second connector 50, four on each of the right and left sides.

Each first contact 70*a* includes a locking part 71*a* that is rectangular in shape and has a projection at its upper edge. The first contact 70*a* includes a mounted portion 72*a* extending backward in an L shape from the lower end of the locking part 71*a*. The first contact 70*a* includes a third contact portion 73*a* extending forward while being bent from the front end of the locking part 71*a*. The first contact 70*a* includes a sixth contact portion 74*a* located at the back edge of the locking part 71*a*.

Each second contact 70*b* is obtained by forming a thin plate of a copper alloy or a corson copper alloy having spring elasticity, such as phosphor bronze, beryllium copper, or titanium copper, into the shape illustrated in FIG. 12 using progressive molding (stamping). The second contact 70*b* is formed only by punching. The working method for the second contact 70*b* is, however, not limited to such and may include, for example, bending in the thickness direction after punching. The surface of the second contact 70*b* is nickel-plated to form a base, and then plated with gold, tin, or the like as a surface layer plating. A plurality of second contacts 70*b* are arranged in the second connector 50 apart from each other in the right-left direction.

Each second contact 70*b* includes a locking part 71*b* that is rectangular in shape and has a projection at its upper edge. The second contact 70*b* includes a mounted portion 72*b* extending backward in an L shape from the lower end of the locking part 71*b*. The second contact 70*b* includes a fourth contact portion 73*b* extending forward while being bent from the front end of the locking part 71*b*.

The second metal member 80 is obtained by forming a thin plate of any metal material into the shape illustrated in FIG. 12 using progressive molding (stamping). The second metal member 80 is obtained by bending in the thickness direction after punching. The working method for the second metal member 80 is, however, not limited to such. For example, the working method may involve only punching.

The second metal member 80 includes a second base portion 81 that forms the upper part of the second metal member 80 and is plate-shaped. As illustrated in FIG. 10, the second metal member 80 includes a third base portion 82 that extends downward while being bent from the second base portion 81. The second metal member 80 includes a fifth contact portion 83 that linearly extends downward from the third base portion 82.

As illustrated in FIG. 12, the second metal member 80 includes a plurality of first claw portions 84*a* extending like a crank from the front edge of the second base portion 81. The plurality of first claw portions 84*a* are arranged apart from each other in the right-left direction. Each first claw portion 84*a* engages with the third hole portion 64*c* of the second insulator 60 in a state in which the second metal member 80 is attached to the second insulator 60.

As illustrated in FIGS. 10 and 12, the second metal member 80 includes a plurality of second claw portions 84*b* protruding forward from the lower edge of the third base portion 82 so as to be folded back. The plurality of second claw portions 84*b* are arranged apart from each other in the right-left direction. Each second claw portion 84*b* engages with the fourth hole portion 64*d* of the second insulator 60 illustrated in FIG. 10 in a state in which the second metal member 80 is attached to the second insulator 60.

The second metal member 80 includes a first locking part 85*a* extending downward in a U shape from each of the right and left ends of the back edge of the second base portion 81. The first locking part 85*a* is fixed in the back wall 62 of the second insulator 60 illustrated in FIG. 10 in a state in which the second metal member 80 is attached to the second insulator 60. The second metal member 80 includes a second locking part 85*b* extending downward while being bent from each of the right and left edges of the second base portion 81. The second locking part 85*b* is fixed in the side wall 61*c* of the second insulator 60 illustrated in FIG. 11 in a state in which the second metal member 80 is attached to the second insulator 60. The second metal member 80 includes a mounted portion 86 extending outward in the right-left direction while being bent from the front end of the lower edge of the second locking part 85*b*.

As illustrated in FIGS. 10 and 12, the second metal member 80 includes a seventh contact portion 87 extending forward from the second base portion 81. The seventh contact portion 87 is bent in a U shape and then extends obliquely downward toward the front. Four seventh contact portions 87 are formed in the second metal member 80. The plurality of seventh contact portions 87 are arranged apart from each other in the right-left direction. Each seventh contact portion 87 is elastically deformable in the up-down direction. The second metal member 80 includes an engaging portion 88 linearly extending obliquely downward from each of the right and left ends of the second base portion 81. The engaging portion 88 is elastically deformable in the up-down direction.

With reference to FIG. 1, the second connector 50 is mounted on a circuit forming surface formed on the upper surface of the circuit board CB. More specifically, the mounted portion 72*a* of each first contact 70*a* is placed on a solder paste applied to a pattern on the circuit board CB. The mounted portion 72*b* of each second contact 70*b* is placed on a solder paste applied to a pattern on the circuit board CB. The mounted portion 86 of the second metal member 80 is placed on a solder paste applied to a pattern on the circuit board CB. Each solder paste is heated to melt in a reflow furnace or the like, to solder the mounted portions 72*a*, 72*b*, and 86 to the foregoing patterns. This completes mounting of the second connector 50 on the circuit board CB. Electronic components other than the second connector 50, such as a central processing unit (CPU), a controller, and memory, are mounted on the circuit forming surface of the circuit board CB.

Figure 13:
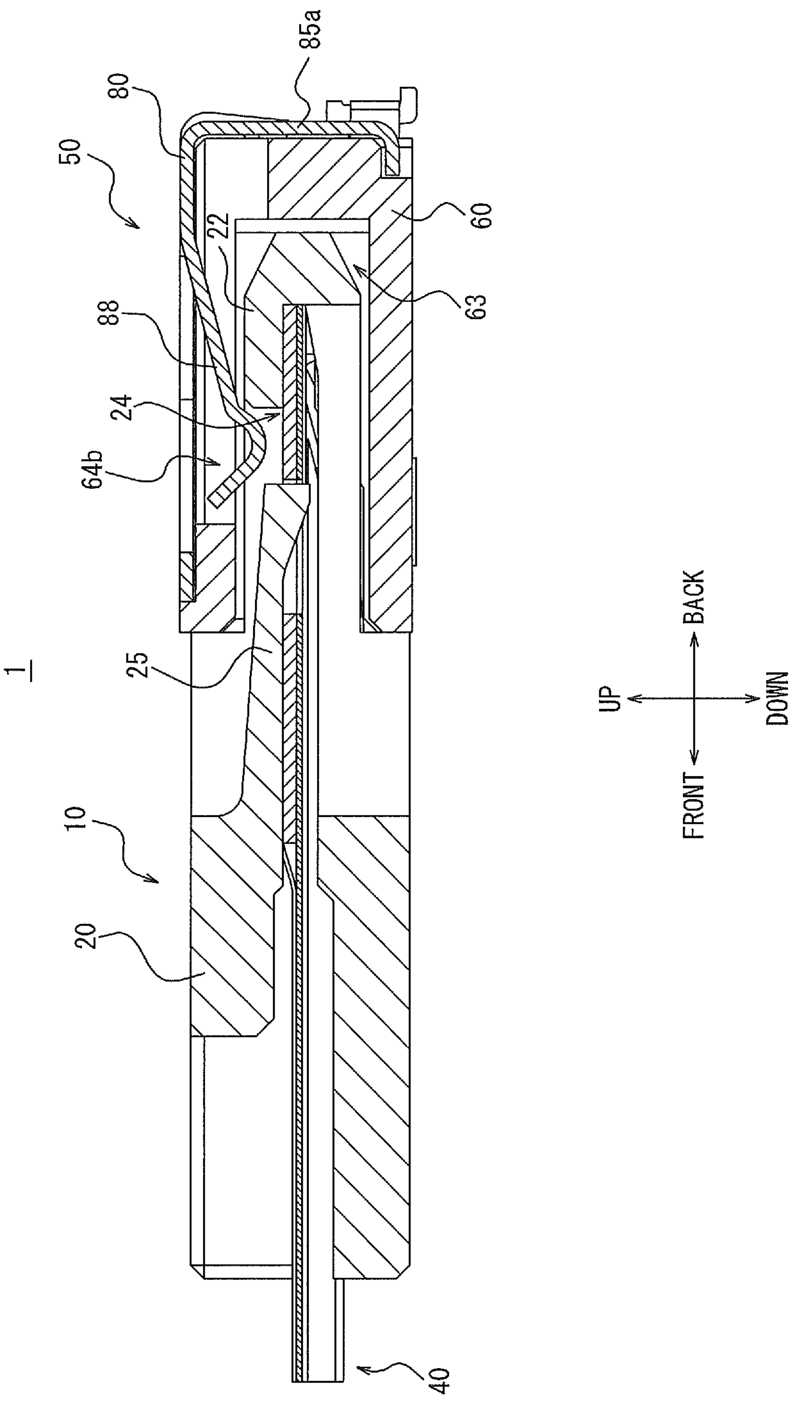
FIG. 13 is a sectional diagram taken along line XIII-XIII in FIG. 1.
Figure 14:
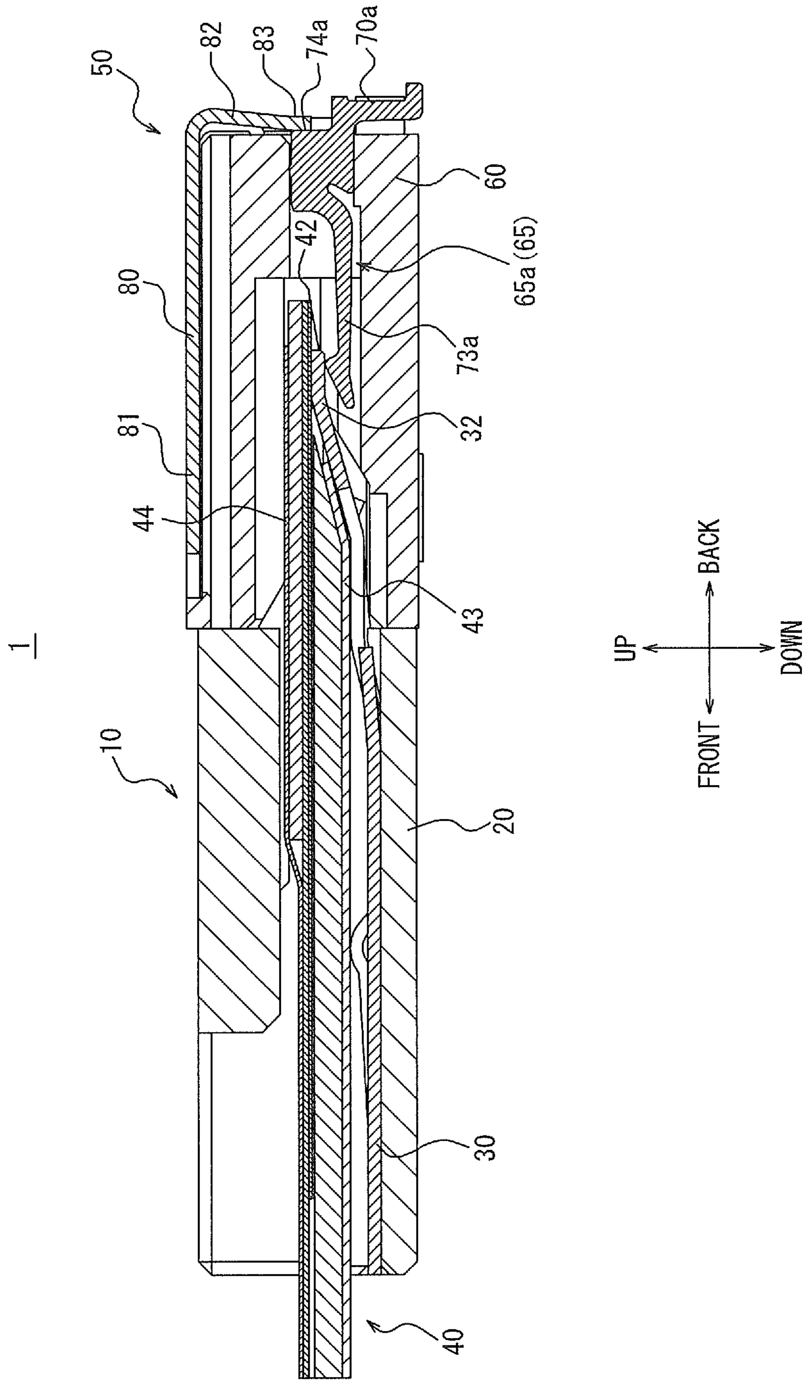
FIG. 14 is a sectional diagram taken along line XIV-XIV in FIG. 1.
Figure 15:
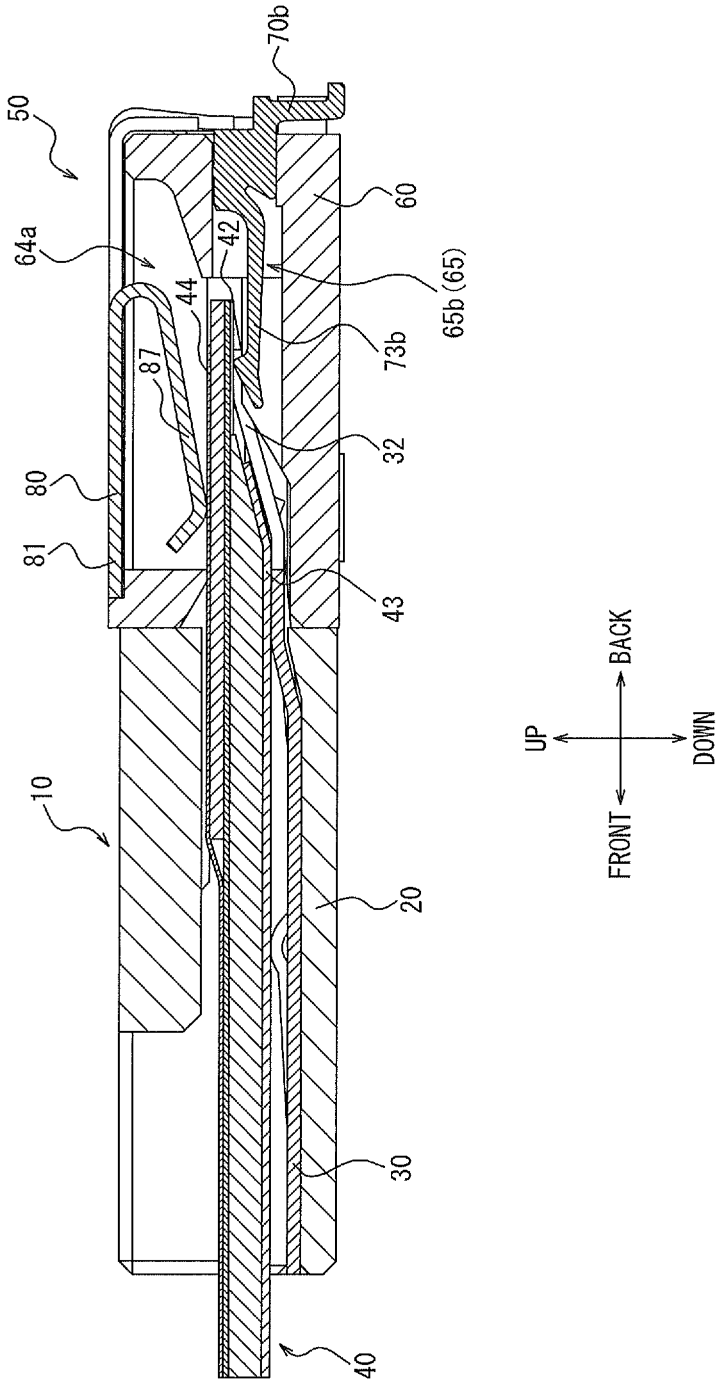
FIG. 15 is a sectional diagram taken along line XV-XV in FIG. 1.

FIG. 13 is a sectional diagram taken along line XIII-XIII in FIG. 1. FIG. 14 is a sectional diagram taken along line XIV-XIV in FIG. 1. FIG. 15 is a sectional diagram taken along line XV-XV in FIG. 1. The functions of the connector module 1 in a connected state in which the first connector 10 holding the connection object 40 is connected to the second connector 50 will be mainly described below.

As illustrated in FIG. 13, the protrusion portion 22 of the first insulator 20 is received in the insertion portion 63 of the second insulator 60. The engaging portion 88 of the second metal member 80 reaches the inside of the insertion portion 63 through the second hole portion 64*b* of the second insulator 60. When the first connector 10 and the second connector 50 are fitted together, the first insulator 20 and the second insulator 60 are fitted together. In such a fitted state, the holding portion 24 of the first insulator 20 and the engaging portion 88 of the second metal member 80 engage with each other.

As illustrated in FIG. 14, the first contact 70*a* is attached to the second insulator 60 by being fixed in the first contact installation groove 65*a* of the second insulator 60. The third contact portion 73*a* of the first contact 70*a* contacts the first metal member 30. More specifically, the third contact portion 73*a* contacts the first contact portion 32 of the first metal member 30. Here, the third contact portion 73*a* elastically deforms downward. The third contact portion 73*a* is located on the same side of the connection object 40 as the first contact portion 32 in the direction orthogonal to the extending direction of the plurality of contact lines 42.

The fifth contact portion 83 of the second metal member 80 contacts the first contact 70*a* and extends from part of the second metal member 80 including the second base portion 81. As also illustrated in FIG. 10, the fifth contact portion 83 contacts two first contacts 70*a* adjacent to each other in the right-left direction. The third base portion 82 of the second metal member 80 extends from the second base portion 81 while being bent to the first contact 70*a* side and lies along the end surface of the second insulator 60 in the extending direction of the plurality of contact lines 42. The sixth contact portion 74*a* of the first contact 70*a* contacts the fifth contact portion 83 of the second metal member 80. The third contact portion 73*a* and the sixth contact portion 74*a* are located at opposite ends of the first contact 70*a* in the extending direction of the plurality of contact lines 42.

As described above, the first contact 70*a* contacts both the first metal member 30 of the first connector 10 and the second metal member 80 of the second connector 50. The first contact 70*a* is used for ground as an example.

As illustrated in FIG. 15, the second contact 70*b* is attached to the second insulator 60 by being fixed in the second contact installation groove 65*b* of the second insulator 60. The fourth contact portion 73*b* of the second contact 70*b* contacts the plurality of contact lines 42. Here, the fourth contact portion 73*b* elastically deforms downward. The fourth contact portion 73*b* is located on the same side of the connection object 40 as the first contact portion 32 in the direction orthogonal to the extending direction of the plurality of contact lines 42.

Thus, the second contact 70*b* directly contacts the plurality of contact lines 42 of the connection object 40. The second contact 70*b* is used for signals as an example.

The seventh contact portion 87 of the second metal member 80 is located in the first hole portion 64*a* of the second insulator 60. The seventh contact portion 87 of the second metal member 80 contacts the connection object 40 and extends obliquely downward from the second base portion 81 while being bent in a U shape. More specifically, the seventh contact portion 87 contacts the second ground portion 44 of the connection object 40. Here, the seventh contact portion 87 elastically deforms upward.

The effects of the first connector 10 will be mainly described below. The same description applies to the connector module 1 including the first connector 10.

With the first connector 10 according to the embodiment described above, it is possible to obtain good transmission characteristics in signal transmission. In the first connector 10, the first contact portion 32 of the first metal member 30 contacts the plurality of contact lines 42 of the connection object 40, and the second contact portion 33 of the first metal member 30 contacts the first ground portion 43 of the connection object 40. Therefore, part of the plurality of contact lines 42 of the connection object 40 can be electrically connected to the first ground portion 43 via the first metal member 30. The contact line 42, the first metal member 30, and the first ground portion 43 thus stably function as one ground. As a result of part of the plurality of contact lines 42 stably functioning as ground, crosstalk between the other contact lines 42 through which electrical signals are transmitted is suppressed.

The first contact portion 32 and the second contact portion 33 are located on the same side of the connection object 40 in the direction orthogonal to the extending direction of the plurality of contact lines 42. Thus, all contact structures between the first metal member 30 and the connection object 40 can be located on the same side. For example, by arranging such contact structures only on the lower side of the connection object 40 and not on the upper side of the connection object 40, the height of the first connector 10 can be reduced as compared with the case where the contact structures are located on both sides. As a result, the height of the whole connector module 1 can be reduced. In addition, since the first contact portion 32 and the second contact portion 33 contact the connection object 40 on the same side of the connection object 40, crosstalk between the plurality of contact lines 42 through which electrical signals are transmitted is suppressed as compared with the case where the contact structures are located on both of the upper and lower sides to contact the connection object 40.

The first contact portion 32 contacts the part of each of the plurality of contact lines 42 adjacent to the boundary R, and the second contact portion 33 contacts the part of the first ground portion 43 adjacent to the boundary R. This can shorten the distance between the first contact portion 32 and the second contact portion 33. The contact part between the first metal member 30 and the contact line 42 and the contact part between the first metal member 30 and the first ground portion 43 are close to each other. The contact line 42, the first metal member 30, and the first ground portion 43 thus function as one ground more stably. Consequently, crosstalk between the other contact lines 42 through which electrical signals are transmitted is further suppressed, and the transmission characteristics in signal transmission are further improved.

The first contact portion 32 and the second contact portion 33 are linearly arranged in the extending direction of the plurality of contact lines 42. This can shorten the distance between the first contact portion 32 and the second contact portion 33 as compared with the case where the first contact portion 32 and the second contact portion 33 are not located on the same straight line. The contact part between the first metal member 30 and the contact line 42 and the contact part between the first metal member 30 and the first ground portion 43 are close to each other. The contact line 42, the first metal member 30, and the first ground portion 43 thus function as one ground more stably. Consequently, crosstalk between the other contact lines 42 through which electrical signals are transmitted is further suppressed, and the transmission characteristics in signal transmission are further improved.

The first contact portion 32 and the second contact portion 33 are elastically deformable and contact the connection object 40 in an elastically deformed state. This improves the contact reliability. For example, even when the connection object 40 vibrates, the first contact portion 32 and the second contact portion 33 deform elastically, as a result of which the contact with the connection object 40 is maintained more reliably. In addition, the tolerance of the thickness of the connection object 40 in the up-down direction can be absorbed when the connection object 40 is inserted into the first connector 10. Thus, the workability when inserting and holding the connection object 40 in the first connector 10 is improved. Moreover, the first connector 10 can improve the contact reliability with the connection object 40 as compared with the case where the first contact portion 32 and the second contact portion 33 are not elastically deformed. This improves the assemblability between the first connector 10 and the connection object 40. Consequently, the productivity when producing electronic devices by electrically connecting the connection object 40 and the circuit board CB via the connector module 1 is improved.

One first contact portion 32 contacts a plurality of contact lines 42. This further ensures the contact between the first metal member 30 and the plurality of contact lines 42 of the connection object 40 and improves the robustness when the first metal member 30 and the plurality of contact lines 42 contact each other. The contact line 42, the first metal member 30, and the first ground portion 43 thus function as one ground more stably. Consequently, crosstalk between the other contact lines 42 through which electrical signals are transmitted is further suppressed.

The first metal member 30 contacts the plurality of contact lines 42 and the first ground portion 43, so that the shielding effect of the first ground portion 43 of the connection object 40 can be extended to the plurality of contact lines 42. The contact line 42, the first metal member 30, and the first ground portion 43 function as one shield.

The first contact 70*a* of the second connector 50 includes the third contact portion 73*a* that contacts the first metal member 30, so that the number of contacts as ground increases. The first contact 70*a* of the second connector 50 can also be electrically connected to the first ground portion 43 via the first metal member 30. The first contact 70*a*, the contact line 42, the first metal member 30, and the first ground portion 43 thus stably function as one ground. Consequently, crosstalk between the other contact lines 42 through which electrical signals are transmitted is further suppressed, and the transmission characteristics in signal transmission are further improved.

The first contact 70*a* indirectly contacts the plurality of contact lines 42 via the third contact portion 73*a* and the first metal member 30. This makes it possible to easily change the spacing between the first contacts 70*a* in the right-left direction.

The third contact portion 73*a* is located on the same side of the connection object 40 as the first contact portion 32 in the direction orthogonal to the extending direction of the plurality of contact lines 42. Thus, all contact structures between the first contact 70*a* and the first metal member 30 and contact structures between the first metal member 30 and the connection object 40 can be located on the same side. For example, by arranging such contact structures only on the lower side of the connection object 40 and not on the upper side of the connection object 40, the height of the whole connector module 1 can be reduced as compared with the case where the contact structures are located on both sides.

The second contact 70*b* includes the fourth contact portion 73*b* that contacts the plurality of contact lines 42, and the fourth contact portion 73*b* is located on the same side of the connection object 40 as the first contact portion 32 in the direction orthogonal to the extending direction of the plurality of contact lines 42. Thus, all contact structures between the second contact 70*b* and the connection object 40 and contact structures between the first metal member 30 and the connection object 40 can be located on the same side. For example, by arranging such contact structures only on the lower side of the connection object 40 and not on the upper side of the connection object 40, the height of the whole connector module 1 can be reduced as compared with the case where the contact structures are located on both sides.

The fifth contact portion 83 of the second metal member 80 contacts the first contact 70*a* and extends from part of the second metal member 80 including the second base portion 81, so that the number of contacts as ground increases. The second metal member 80 can also be electrically connected to the first ground portion 43 via the first contact 70*a* and the first metal member 30. The second metal member 80, the first contact 70*a*, the contact line 42, the first metal member 30, and the first ground portion 43 thus stably function as one ground. Consequently, crosstalk between the other contact lines 42 through which electrical signals are transmitted is further suppressed, and the transmission characteristics in signal transmission are further improved.

The second metal member 80 is press-fitted into the second insulator 60 so as to cover the whole second insulator 60 from above, so that the outflow and inflow of noise for electrical signals are suppressed. For example, electromagnetic noise generated from an electrical signal transmitted by the second contact 70*b* is prevented from flowing out of the second connector 50. For example, electromagnetic noise generated from other electronic components arranged on the circuit board CB is prevented from flowing into the second connector 50.

The fifth contact portion 83 extends from the third base portion 82 that extends from the second base portion 81 while being bent to the first contact 70*a* side and lies along the end surface of the second insulator 60 in the extending direction of the plurality of contact lines 42. This improves the robustness as the strength of the contact portion, as compared with the case where the fifth contact portion 83 extends directly from the second base portion 81. Therefore, the second metal member 80 and the first contact 70*a* can stably contact each other via the fifth contact portion 83. The second metal member 80, the first contact 70*a*, the contact line 42, the first metal member 30, and the first ground portion 43 thus function as one ground more stably. Consequently, crosstalk between the other contact lines 42 through which electrical signals are transmitted is further suppressed, and the transmission characteristics in signal transmission are further improved.

The third contact portion 73*a* and the sixth contact portion 74*a* are located at opposite ends of the first contact 70*a* in the extending direction of the plurality of contact lines 42. This enables stable contact of the first contacts 70*a* with both the first metal member 30 of the first connector 10 and the second metal member 80 of the second connector 50. Therefore, the first metal member 30 and the second metal member 80 can be electrically connected to each other stably via the first contact 70*a*. The second metal member 80, the first contact 70*a*, the contact line 42, the first metal member 30, and the first ground portion 43 thus function as one ground more stably. Consequently, crosstalk between the other contact lines 42 through which electrical signals are transmitted is further suppressed, and the transmission characteristics in signal transmission are further improved.

The seventh contact portion 87 of the second metal member 80 extends from the second base portion 81 and contacts the connection object 40, so that the number of contacts as ground increases. The second metal member 80 is electrically connected to the first ground portion 43 of the connection object 40 via the fifth contact portion 83 and also electrically connected to the second ground portion 44 of the connection object 40 via the seventh contact portion 87. Therefore, the second ground portion 44 can also be electrically connected to the first ground portion 43 via the second metal member 80, the first contact 70*a*, and the first metal member 30. The second ground portion 44, the second metal member 80, the first contact 70*a*, the contact line 42, the first metal member 30, and the first ground portion 43 thus stably function as one ground. Consequently, crosstalk between the other contact lines 42 through which electrical signals are transmitted is further suppressed, and the transmission characteristics in signal transmission are further improved.

The seventh contact portion 87 is elastically deformable. This improves the contact reliability. For example, even when the connection object 40 vibrates, the seventh contact portion 87 deforms elastically, as a result of which the contact with the connection object 40 is maintained more reliably. In addition, the tolerance of the thickness of the connection object 40 in the up-down direction can be absorbed when the connection object 40 is inserted into the second connector 50. Thus, the workability when inserting the connection object 40 held by the first connector 10 into the second connector 50 is improved. Moreover, the second connector 50 can hold the connection object 40 more stably than in the case where the seventh contact portion 87 is not elastically deformed. The second connector 50 can also improve the contact reliability with the connection object 40. This improves the assemblability between the second connector 50 and the connection object 40. Consequently, the productivity when producing electronic devices by electrically connecting the connection object 40 and the circuit board CB via the connector module 1 is improved.

It is to be understood by a person of ordinary skill in the art that the presently disclosed techniques may also be realized in specific forms other than the foregoing embodiment without departing from the technical spirit or essential features of the present disclosure. Therefore, the above description is illustrative and not restrictive. The scope of the present disclosure is defined by the accompanying claims rather than by the above description. Amongst all modifications, those falling within the corresponding equivalent scope are encompassed within the scope of the present disclosure.

For example, the shape, position, orientation, and number of each component described above are not limited to those in the above description and the illustration in the drawings. The shape, position, orientation, and number of each component may be freely set as long as its functions can be achieved.

The method of assembling the first connector 10 is not limited to the foregoing method. The method of assembling the first connector 10 may be any method with which each function can be achieved. For example, the first metal member 30 may be integrally formed with the first insulator 20 by insert molding, instead of press fitting.

The method of assembling the second connector 50 is not limited to the foregoing method. The method of assembling the second connector 50 may be any method with which each function can be achieved. For example, at least one of the first contact 70*a*, the second contact 70*b*, and the second metal member 80 may be integrally formed with the second insulator 60 by insert molding, instead of press fitting.

Although the foregoing embodiment describes the case where the first contact portion 32 and the second contact portion 33 are located on the same side of the connection object 40 in the direction orthogonal to the extending direction of the plurality of contact lines 42, the present disclosure is not limited to such. The first contact portion 32 and the second contact portion 33 may be located on different sides of the connection object 40.

Although the foregoing embodiment describes the case where the first contact portion 32 contacts the part of each of the plurality of contact lines 42 adjacent to the boundary R and the second contact portion 33 contacts the part of the first ground portion 43 adjacent to the boundary R, the present disclosure is not limited to such. The first contact portion 32 may contact any part of the plurality of contact lines 42, and the second contact portion 33 may contact any part of the first ground portion 43.

Although the foregoing embodiment describes the case where the first contact portion 32 and the second contact portion 33 are arranged linearly in the extending direction of the plurality of contact lines 42, the present disclosure is not limited to such. The first contact portion 32 and the second contact portion 33 may be arranged not on the same straight line but on different straight lines in the extending direction of the plurality of contact lines 42.

Although the foregoing embodiment describes the case where both the first contact portion 32 and the second contact portion 33 are elastically deformable and contact the connection object 40 in an elastically deformed state, the present disclosure is not limited to such. Only one of the first contact portion 32 and the second contact portion 33 may be elastically deformable, or neither of them may be elastically deformable.

Although the foregoing embodiment describes the case where one first contact portion 32 contacts two contact lines 42 adjacent to each other, the present disclosure is not limited to such. One first contact portion 32 may contact three or more contact lines 42, or contact only one contact line 42.

Although the foregoing embodiment describes the case where a total of four pairs of the first contact portion 32 and the second contact portion 33 are formed in the first metal member 30, two pairs on each of the right and left sides, as illustrated in FIG. 6, the present disclosure is not limited to such. Any numbers of first contact portions 32 and second contact portions 33 may be formed at any other positions different from the positions illustrated in FIG. 6.

Although the foregoing embodiment describes the case where the first contact 70*a* includes the third contact portion 73*a* that contacts the first metal member 30, the present disclosure is not limited to such. The first contact 70*a* may contact, for example, the plurality of contact lines 42 of the connection object 40, instead of contacting the first metal member 30. Here, the first contact 70*a* may be used not for ground but for signals.

Although the foregoing embodiment describes the case where the third contact portion 73*a* is located on the same side of the connection object 40 as the first contact portion 32 in the direction orthogonal to the extending direction of the plurality of contact lines 42, the present disclosure is not limited to such. The first contact portion 32 and the third contact portion 73*a* may be located on different sides of the connection object 40.

Although the foregoing embodiment describes the case where the fourth contact portion 73*b* is located on the same side of the connection object 40 as the first contact portion 32 in the direction orthogonal to the extending direction of the plurality of contact lines 42, the present disclosure is not limited to such. The first contact portion 32 and the fourth contact portion 73*b* may be located on different sides of the connection object 40.

Although the foregoing embodiment describes the case where the second metal member 80 includes the fifth contact portion 83 that contacts the first contact 70*a* and extends from part of the second metal member 80 including the second base portion 81, the present disclosure is not limited to such. The second metal member 80 may not contact the first contact 70*a*. Although the foregoing embodiment describes the case where the fifth contact portion 83 contacts two first contacts 70*a* adjacent to each other in the right-left direction, the present disclosure is not limited to such. The fifth contact portion 83 may contact one first contact 70*a* or three or more first contacts 70*a*.

Although the foregoing embodiment describes the case where the fifth contact portion 83 of the second metal member 80 extends from the third base portion 82, the present disclosure is not limited to such. The fifth contact portion 83 may directly extend from the second base portion 81.

Although the foregoing embodiment describes the case where the third contact portion 73*a* and the sixth contact portion 74*a* are located at opposite ends of the first contact 70*a* in the extending direction of the plurality of contact lines 42, the present disclosure is not limited to such. The third contact portion 73*a* and the sixth contact portion 74*a* may be formed at any positions in the first contact 70*a*.

Although the foregoing embodiment describes the case where the second metal member 80 includes the elastically deformable seventh contact portion 87 that extends from the second base portion 81 and contacts the connection object 40, the present disclosure is not limited to such. The seventh contact portion 87 may not be elastically deformable. The second metal member 80 may not include the seventh contact portion 87 and may not contact the connection object 40.

Although the foregoing embodiment describes the case where two first contacts 70*a* are arranged between a plurality of second contacts 70*b* as illustrated in FIG. 12, the present disclosure is not limited to such. The first contacts 70*a* and the second contacts 70*b* may be arranged in any way. For example, one first contact 70*a* may be provided between a plurality of second contacts 70*b*, or first contacts 70*a* and second contacts 70*b* may be arranged alternately.

Figure 16:
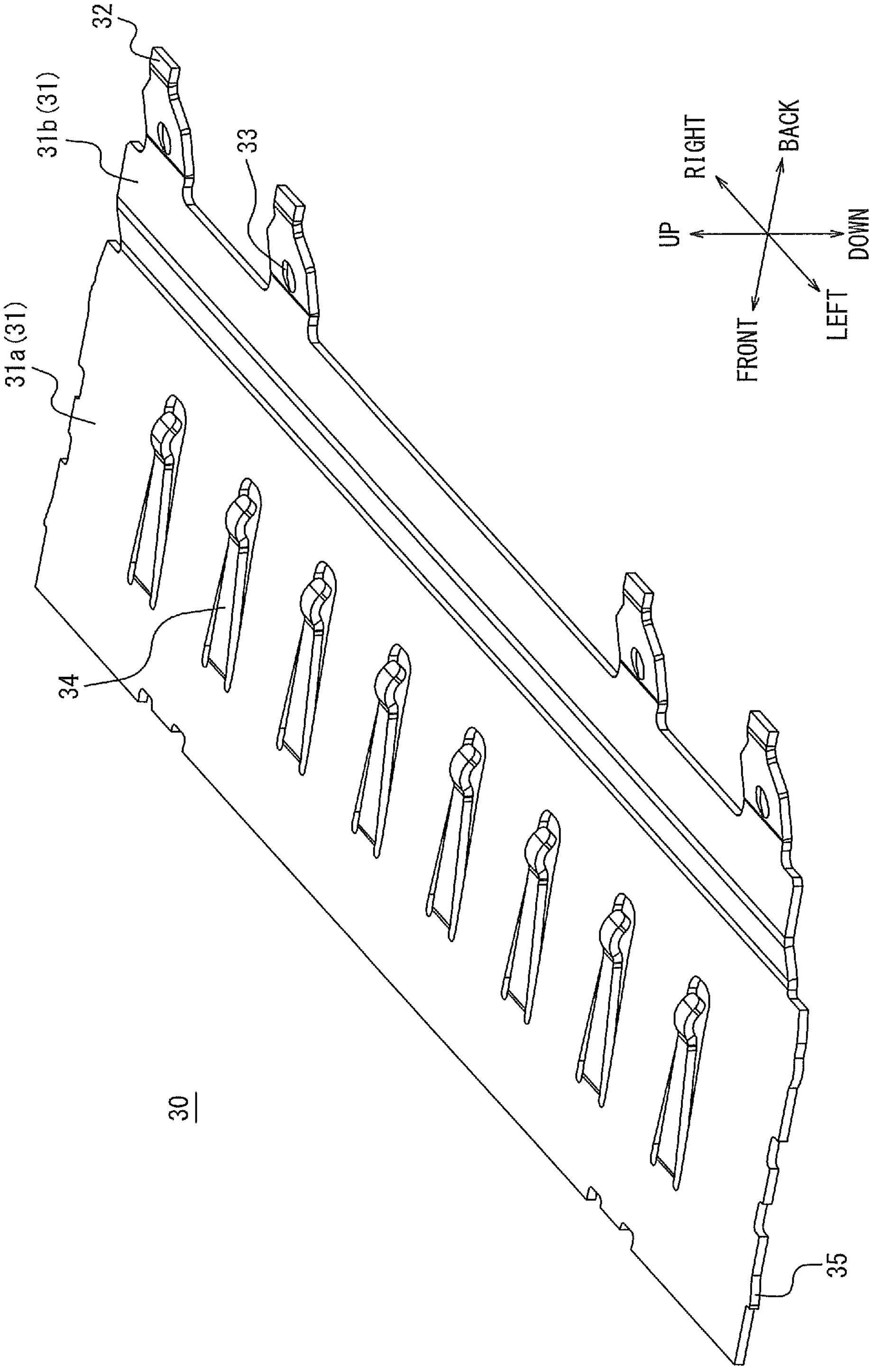
FIG. 16 is an external perspective diagram illustrating a first metal member alone according to a modification, in a top view.

FIG. 16 is an external perspective diagram illustrating a first metal member 30 alone according to a modification, in a top view. The structure of the first metal member 30 according to the modification will be described below with reference to FIG. 16, mainly focusing on the differences from FIG. 6.

The first contact portion 32 may not be notched in the thickness direction at the center of the part formed wide in the right-left direction, unlike in the first metal member 30 in FIG. 6. In addition, the length in the front-back direction of the back end of the first contact portion 32 extending horizontally may be shorter than that of the first contact portion 32 of the first metal member 30 in FIG. 6.

The second contact portion 33 may be formed as a projection that is located at the center of the part formed wide in the right-left direction in the first contact portion 32 and protrudes from the surface of the first contact portion 32. The second contact portion 33 may protrude from the surface of the first contact portion 32 so as to be circular in a top view.

Figure 17:
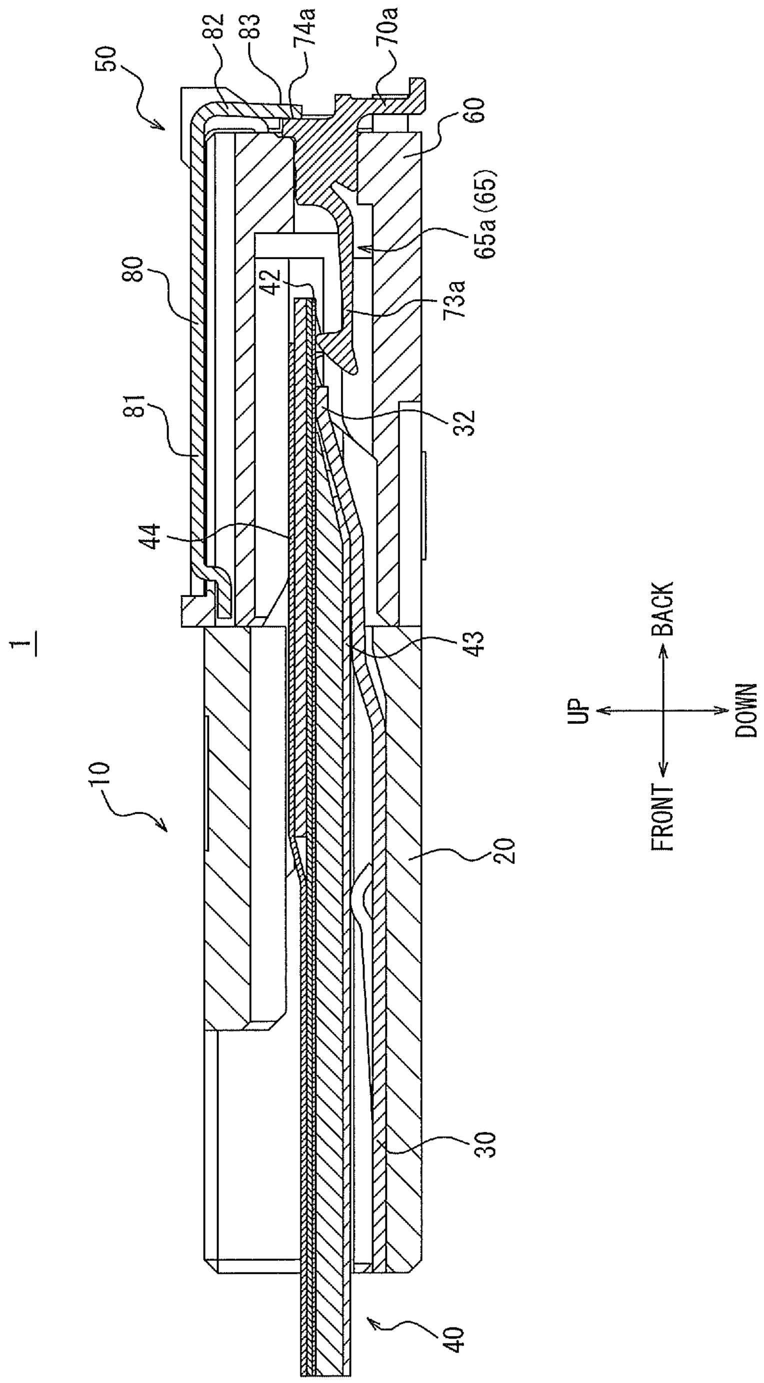
FIG. 17 is a sectional diagram corresponding to FIG. 14 and illustrating a connector module according to the modification.

FIG. 17 is a sectional diagram corresponding to FIG. 14 and illustrating a connector module 1 according to the modification. Although the foregoing embodiment describes the case where the third contact portion 73*a* of the first contact 70*a* contacts the first metal member 30, the present disclosure is not limited to such. The third contact portion 73*a* of the first contact 70*a* may contact the plurality of contact lines 42 which the first contact portion 32 contacts.

In this case, the elastic deformation of the first contact 70*a* is reduced by the thickness of the first metal member 30 as compared with the case illustrated in FIG. 14. In such a connector module 1, the first contact 70*a* can be kept from being greatly deformed or bent and can be prevented from buckling. Moreover, burrs of the first metal member 30 caused as a result of the tip of the first contact portion 32 of the first metal member 30 contacting the third contact portion 73*a* of the first contact 70*a* when the connection object 40 held by the first connector 10 is inserted into the second connector 50 can be prevented.

The above-described first connector 10 or connector module 1 is mounted in an electronic device. Examples of the electronic device include any information devices such as a personal computer, a game machine, a copier, a printer, a facsimile machine, and a multifunction machine. Examples of the electronic device include any acoustic video devices such as a liquid crystal television, a recorder, a camera, and headphones. The electronic device is not limited to such. Examples of the electronic device include any on-vehicle devices such as a camera, a radar, a drive recorder, and an engine control unit. Examples of the electronic device include any on-vehicle devices used in vehicle-mounted systems such as a car navigation system, an advanced driving support system, and a security system. Examples of the electronic device include any industrial devices.

Good transmission characteristics in signal transmission achieved by the above-described first connector 10 or connector module 1 can improve the reliability of such electronic devices as products.

REFERENCE SIGNS LIST 1 connector module
10 first connector
20 first insulator
21 outer peripheral wall
21*a* ceiling wall
21*b* bottom wall
21*c* side wall
22 protrusion portion
23 insertion portion
24 holding portion
25 locking portion
26 attachment portion
30 first metal member
31 first base portion
31*a* first part
31*b* second part
32 first contact portion

33 second contact portion
34 tip-up portion
35 locking part
40 connection object
41 reinforcement portion
42 contact line
43 first ground portion
44 second ground portion
45 locked portion
50 second connector
60 second insulator
61 outer peripheral wall
61*a* ceiling wall
61*b* bottom wall
61*c* side wall
62 back wall
63 insertion portion
64*a* first hole portion
64*b* second hole portion
64*c* third hole portion
64*d* fourth hole portion
65 contact installation groove
65*a* first contact installation groove
65*b* second contact installation groove
70*a* first contact
71*a* locking part
72*a* mounted portion
73*a* third contact portion
74*a* sixth contact portion
70*b* second contact
71*b* locking part
72*b* mounted portion
73*b* fourth contact portion
80 second metal member
81 second base portion
82 third base portion
83 fifth contact portion
84*a* first claw portion
84*b* second claw portion
85*a* first locking part
85*b* second locking part
86 mounted portion
87 seventh contact portion
88 engaging portion
CB circuit board
R boundary

The invention claimed is:

1. A connector module comprising:
a first connector configured to be attached to a connection object that includes a plurality of contact lines exposed at a tip of the connection object and a ground portion covering part of the plurality of contact lines, the first connector comprising:
a first insulator including a holding portion configured to hold the connection object in a state of accommodating the tip; and
a first metal member attached to the first insulator,
wherein the first metal member includes:
a first base portion that is plate-shaped;
a first contact portion configured to extend from the first base portion toward the tip and contact the plurality of contact lines; and
a second contact portion configured to be located more on a side opposite to the tip than the first contact portion and contact the ground portion;
a second connector configured to be fitted to the first connector, wherein the second connector includes:
a second insulator configured to be fitted to the first insulator; and
a first contact attached to the second insulator, the first contact including a third contact portion configured to contact the first metal member; and
a second metal member attached to the second insulator, the second metal member including a second base portion that is plate-shaped and a fifth contact portion contacting the first contact and extending from part of the second metal member including the second base portion.

2. The connector module according to claim 1, wherein the first contact portion and the second contact portion are configured to be located on a same side of the connection object in a direction orthogonal to an extending direction of the plurality of contact lines.

3. The connector module according to claim 2, wherein the first contact portion is configured to contact a part of each of the plurality of contact lines adjacent to a boundary between each contact line and the ground portion, and
the second contact portion is configured to contact a part of the ground portion adjacent to the boundary.

4. The connector module according to claim 2, wherein the first contact portion and the second contact portion are configured to be arranged linearly in the extending direction.

5. The connector module according to claim 1, wherein at least one of the first contact portion and the second contact portion is elastically deformable and is configured to contact the connection object in an elastically deformed state.

6. The connector module according to claim 1, wherein one first contact portion is configured to contact two or more of the plurality of contact lines.

7. The connector module according to claim 1, wherein the third contact portion is configured to be located on a same side of the connection object as the first contact portion in a direction orthogonal to an extending direction of the plurality of contact lines.

8. The connector module according to claim 1, comprising
a second contact attached to the second insulator,
wherein the second contact includes a fourth contact portion configured to contact the plurality of contact lines, and
the fourth contact portion is configured to be located on a same side of the connection object as the first contact portion in a direction orthogonal to an extending direction of the plurality of contact lines.

9. The connector module according to claim 1, wherein the second metal member includes a third base portion extending from the second base portion while being bent toward the first contact and lying along an end surface of the second insulator in an extending direction of the plurality of contact lines, and
the fifth contact portion extends from the third base portion.

10. The connector module according to claim 1, wherein the first contact includes a sixth contact portion contacting the fifth contact portion of the second metal member, and
the third contact portion and the sixth contact portion are arranged at opposite ends of the first contact in an extending direction of the plurality of contact lines.

11. The connector module according to claim 1, wherein the second metal member includes an elastically deformable seventh contact portion configured to contact the connection object and to extend from the second base portion.

* * * * *